(12) United States Patent
Beall

(10) Patent No.: US 11,402,273 B2
(45) Date of Patent: Aug. 2, 2022

(54) SYSTEMS AND APPROACHES FOR IMPROVING ACCURACY OF TEMPERATURE MEASUREMENTS USING THERMAL IMAGING

(71) Applicant: ECB CONSULTING LLC, Eden Prairie, MN (US)

(72) Inventor: Erik Bryan Beall, Eden Prairie, MN (US)

(73) Assignee: ECB CONSULTING LLC, Eden Prairie, MN (US)

( * ) Notice: Subject to any disclaimer, the term of this patent is extended or adjusted under 35 U.S.C. 154(b) by 0 days.

(21) Appl. No.: 17/138,668

(22) Filed: Dec. 30, 2020

(65) Prior Publication Data

US 2021/0302234 A1 Sep. 30, 2021

Related U.S. Application Data

(60) Provisional application No. 63/121,749, filed on Dec. 4, 2020, provisional application No. 63/013,131, filed
(Continued)

(51) Int. Cl.
*G01J 5/00* (2022.01)
*G01J 5/53* (2022.01)
(Continued)

(52) U.S. Cl.
CPC .............. *G01J 5/53* (2022.01); *G01J 5/0025* (2013.01); *G01J 5/10* (2013.01); *G01K 15/005* (2013.01);
(Continued)

(58) Field of Classification Search
CPC ..... A61B 5/015; A61B 5/0077; A61B 5/0064; A61B 5/0086; A61B 2018/00791;
(Continued)

(56) References Cited

U.S. PATENT DOCUMENTS 5,062,432 A 11/1991 James et al.
5,115,815 A 5/1992 Hansen
(Continued)

FOREIGN PATENT DOCUMENTS

CN 112484861 A * 3/2021
EP 1302759 A2 * 4/2003 .............. G01J 5/602
(Continued)

OTHER PUBLICATIONS

Screen captures from YouTube video clip entitled "FACTS—The Importance of Accuracy in Temperature Screening," 3 pages, uploaded on Oct. 7, 2020 by user "AMETEK Land". Retrieved from Internet on Jan. 4, 2021: <https://www.youtube.com/watch?v=jLdeH3ZuKKg &list=PLhr2XhlqzbOfazvKH3Mbm7qwx9rH-084R&index=3 <https://protect-us.mimecast.com/s/XnTJCAD8y3i9v92glGcCAQ>>.
(Continued)

*Primary Examiner* — Gail Kaplan Verbitsky
(74) *Attorney, Agent, or Firm* — Marshall, Gerstein & Borun LLP

(57) ABSTRACT

A temperature detection system includes a housing, a thermal imaging system at least partially disposed within the housing, and a data correction system communicatively coupled with the thermal imaging system. The thermal imaging system is configured to capture at least one thermal image of a subject. The data correction system is configured to correct at least one error associated with the at least one thermal image of the subject.

15 Claims, 16 Drawing Sheets

Related U.S. Application Data on Apr. 21, 2020, provisional application No. 63/001,081, filed on Mar. 27, 2020.

(51) Int. Cl.
| | |
|---|---|
| *G01J 5/10* | (2006.01) |
| *G01K 15/00* | (2006.01) |
| *H04N 5/33* | (2006.01) |
| *G01J 5/80* | (2022.01) |

(52) U.S. Cl.
CPC .......... *G01J 5/80* (2022.01); *G01J 2005/0077* (2013.01); *H04N 5/33* (2013.01)

(58) Field of Classification Search
CPC ... A61B 90/361; A61B 90/36; A61B 90/0085; G01J 2005/0077; G01J 5/0025; G01J 2005/0085; G01J 5/00; G01J 2005/0048; G01J 5/10; G01J 5/522; G01K 15/005; H04N 5/33
USPC .................................. 374/121; 702/99, 135
See application file for complete search history.

(56) References Cited

U.S. PATENT DOCUMENTS

| | | | | |
|---|---|---|---|---|
| 5,148,809 | A * | 9/1992 | Biegeleisen-Knight | A61B 8/488 348/163 |
| 5,341,142 | A * | 8/1994 | Reis | F41G 7/2226 244/3.15 |
| 5,994,699 | A * | 11/1999 | Akagawa | H04N 5/33 250/332 |
| 6,751,340 | B2 * | 6/2004 | Prokoski | A61B 5/1176 348/14.09 |
| 6,964,514 | B2 * | 11/2005 | Land | G01K 11/006 374/122 |
| 7,340,293 | B2 | 3/2008 | McQuilkin | |
| 7,422,365 | B2 * | 9/2008 | Chamberlain | G01J 5/10 250/338.1 |
| 10,094,794 | B2 * | 10/2018 | Thompson | G06K 9/2018 |
| 10,444,070 | B2 * | 10/2019 | Kester | G01J 3/0229 |
| 2010/0040098 | A1 * | 2/2010 | Parent | G02B 19/0014 372/29.021 |
| 2010/0226495 | A1 * | 9/2010 | Kelly | G11B 20/0021 380/28 |
| 2012/0104235 | A1 * | 5/2012 | Sumi | H04N 5/243 250/208.1 |
| 2012/0205529 | A1 * | 8/2012 | Chamming's | H04N 5/3651 250/252.1 |
| 2012/0218418 | A1 * | 8/2012 | Strandemar | G01J 5/0859 348/164 |
| 2012/0307859 | A1 * | 12/2012 | Gogol | G01K 17/20 374/1 |
| 2013/0188058 | A1 | 7/2013 | Nguyen et al. | |
| 2014/0008526 | A1 * | 1/2014 | Zeng | H04N 5/33 250/252.1 |
| 2014/0056536 | A1 * | 2/2014 | Zamyatin | G06T 5/002 382/260 |
| 2014/0284449 | A1 * | 9/2014 | Uchida | G02B 7/34 250/201.2 |
| 2015/0049941 | A1 * | 2/2015 | Hall | G08B 13/19695 382/165 |
| 2015/0319378 | A1 | 11/2015 | Hoelter et al. | |
| 2015/0326799 | A1 * | 11/2015 | Hall | H04N 5/2354 348/164 |
| 2016/0292826 | A1 | 10/2016 | Beall | |
| 2017/0358105 | A1 | 12/2017 | Torres et al. | |
| 2018/0071452 | A1 * | 3/2018 | Sharma | A61M 5/007 |
| 2019/0128660 | A1 | 5/2019 | Gutierrez Bravo et al. | |
| 2019/0221004 | A1 * | 7/2019 | Tokita | G08G 1/166 |
| 2020/0051261 | A1 * | 2/2020 | Tsuruyama | G06T 7/50 |
| 2021/0037197 | A1 | 2/2021 | Kester et al. | |
| 2021/0159263 | A1 * | 5/2021 | Ang | H01L 27/14643 |
| 2021/0192772 | A1 * | 6/2021 | Tate | G06T 7/70 |

FOREIGN PATENT DOCUMENTS

| | | | | | |
|---|---|---|---|---|---|
| FR | | 2923603 | A1 * | 5/2009 | ............. G01J 5/524 |
| KR | 1020040010172 | | | 1/2004 | |
| WO | WO-2020163349 | | A1 * | 8/2020 | ........... G01S 17/894 |

OTHER PUBLICATIONS

MDF Instruments, "Febris®," 2016-2021. Retrieved from Internet on Jan. 6, 2021: <URL:https://mdfinstruments.com/products/mdf-febris-non-contact-infrared-digital-thermometer-forehead>.

Hanaoka et al., "80×32 SOI diode-based uncooled IRFPAs for thermal detectors", Proceedings of SPIE, vol. 11741; 1-9 (2021).

IEC/ISO IEC 80601-2-59, "Particular requirements for the basic safety and essential performance of screening thermographs for human febrile temperature screening," Geneva, Switzerland: International Electrotechnical Commission (IEC) / International Organization for Standardization (ISO); 2017.

H. McEvoy, R. Simpson and G. Machin, "Review of current thermal imaging temperature calibration and evaluation facilities, practices and procedures, across EURAMET (European Association of National Metrology Institutes)", QIRT 2012, 11th International Conference on Quantitative InfraRed Thermography, Jun. 11-14, 2012, Naples Italy.

Infraspection Institute, "Standard for Measuring Distance/Target Size Values for Infrared Imaging Radiometers", 2008 Edition, Burlington, NJ.

Peter Saunders and Hamish Edgar, "Size-of-source effect correction for a thermal imaging radiation thermometer", High Temperatures-High Pressures, vol. 31, pp. 283-292 (1999).

Peter Saunders, "Dealing with the Size-of-Source Effect in the Calibration of Direct-Reading Radiation Thermometers", AIP Conf. Proc. 1552, pp. 619-624 (2013).

J. Solorio-Leyva, J. Suárez-Romero, J. Cortés-Reynoso, J. Hurtado-Ramos, and E. Tepichín-Rodríguez, "Corrections of size-of-source effect and distance effect in radiometric measurements of radiance", Applied Optics, vol. 44, No. 13, pp. 2511-2518 (2005).

J. Solorio-Leyva, J. Suárez-Romero, J. Hurtado-Ramos, E. Tepichín-Rodríguez, and J. Cortés-Reynoso, "The size-of-source effect in practical measurements of radiance", 5th Iberoamerican Meeting on Optics and 8th Latin American Meeting on Optics, Lasers, and Their Applications, edited by A. Marcano O., J. L. Paz, Proc. of SPIE, vol. 5622 (SPIE, Bellingham, WA, 2004), pp. 1243-1248.

P. Ghassemi, T. J. Pfefer, J. P. Casamento, R. Simpson, and Q. Wang, "Best practices for standardized performance testing of infrared thermographs intended for fever screening", PLoS ONE 13(9), 2018.

Yangling Zhou, Pejman Ghassemi, Michelle Chen, David McBride, Jon P. Casamento, T. Joshua Pfefer, and Quanzeng Wang, "Clinical evaluation of fever-screening thermography: impact of consensus guidelines and facial measurement location," J. Biomed. Opt., vol. 25(9), 097002-1-21 (Sep. 12, 2020).

C. Hinnerichs, "Efficacy of Fixed Infrared Thermography for Identification of Subjects with Influenza-like Illness", Dissertation in Public Health/Epidemiology, Walden University (2011).

IEC/ISO IEC 80601-2-56, "Particular requirements for basic safety and essential performance of clinical thermometers for body temperature measurement," Geneva, Switzerland: International Electrotechnical Commission (IEC) / International Organization for Standardization (ISO); 2017.

S. R. Dodd et al., "In a systematic review, infrared ear thermometry for fever diagnosis in children finds poor sensitivity", Journal of Clinical Epidemiology, 59 (4), pp. 354-357 (2006).

David A. Low, Albert Vu, Marilee Brown, Scott L. Davis, David M. Keller, Benjamin D. Levine, and Craig G. Crandall, "Temporal Thermometry Fails to Track Body Core Temperature during Heat Stress", Medicine & Science In Sprots & Exercise, pp. 1029-1035 (2007).

(56) References Cited

OTHER PUBLICATIONS

Lila Iznita Izhar and Maria Petrou, "Chapter 2: Thermal Imaging in Medicine", Advances in Imaging and Electron Physics, vol. 171, pp. 41-114 (2012).
Eugene H. Wissler, "Pennes' 1948 paper revisited", J. Appl. Physiol., 85:1, pp. 35-41 (1998).
Jen-Hong Tan et al., "Infrared thermography on ocular surface temperature: A review", Infrared Physics & Technology, vol. 52, pp. 97-108 (2009).
J. K. Slettedal and A. Ringvoid, "Correlation between corneal and ambient temperature with particular focus on polar conditions", Acta Ophthalmol., 93:5, 2015, 422-426.
An V. Nguyen et al, "Comparison of 3 Infrared Thermal Detection Systems and Self-Report for Mass Fever Screening", Emerging Infectious Diseases, vol. 16, No. 11, pp. 1710-1717 (2010).
Eddie Y.K. Ng et al., "Analysis of IR thermal imager for mass blind fever screening", Journal of Microvascular Research, vol. 68, pp. 104-109 (2004).
Ming-Fu Chiang et al, "Mass Screening of Suspected Febrile Patients with Remote-sensing Infrared Thermography: Alarm Temperature and Optimal Distance", J Formos Med Assoc, vol. 107, No. 12, pp. 937-944 (2008).
P. Hausfater et all., "Cutaneous Infrared Thermometry for Detecting Febrile Patients", Emerging InfectiousDiseases, vol. 14, No. 8, pp. 1255-1258 (2008).
P. Saunders, "Correcting Radiation Thermometry Measurements for the Size-of-Source Effect", Int. J. Thermophys, 32, pp. 1633-1654, (2011).
Peter Saunders and Hamish Edgar, "On the characterization and correction of the size-of-source effect in radiation thermometers", Metrologia, vol. 46, pp. 62-74 (2009).
P. Saunders and D.R. White, "A Focus Effect in some Thermal Imaging Systems", AIP Conf. Proc. 1552, pp. 625-630 (2013).
M. Bart et al., "A New Method to Determine the Size-of-Source Effect", Int J. Thermophys, vol. 28, pp. 2111-2117 (2007).
A. Manoi and P. Saunders, "Size-of-source Effect in Infrared Thermometers with Direct Reading of Temperature", Int J Thermophys, 38:101 (2017).
P. Saunders and D. R. White, "A theory of reflections for traceable radiation thermometry", Metrologia, 32, pp. 1-10 (1995).
Karel Allegaert et al., "Tympanic, Infrared Skin, and Temporal Artery Scan Thermometers Compared with Rectal Measurement in Children: A Real-Life Assessment", Curr Ther Res Clin Exp., 76, pp. 34-38 (2014).
Georgia K. Chaseling, Craig G. Crandall, and Daniel Gagnon, "Skin blood flow measurements during heat stress: technical and analytical considerations", Am J Physiol Regul Integr Comp Physiol., (2019).
EFJ Ring and K Ammer, "The Technique of Infra red Imaging in Medicine", Thermology international 10/1 (2000).
Keith R. Powell et al., "Ear Temperature Measurements in Healthy Children Using the Arterial Heat Balance Method", Clinical Pediatrics, pp. 333-336 (2001).
Lina Zhai, Rene M. Rossi and Jun Li, "Future directions in the use of manikins", Manikins for Textile Evaluation, pp. 365-386 (2017).
Exergen Corporation, Temperature Assessment via the Temporal Artery: Validation of a New Method, 9:26, Rev 5 (1999).
ASTM E1965-98, "Standard Specification for Infrared Thermometers for Intermittent Determination of Patient Termperature," ASTM International, West Conshohocken, PA, 1998.
Jordan Hristov, Bio-Heat Models Revisited: Concepts, Derivations, Nondimensalization and Fractionalization Approaches, Frontiers in Physics, vol. 7, pp. 1-36 (2019).
Jonathan E. Wingo, Craig G. Crandall, and Glen P. Kenny, "Chapter 2, Human Heat Physiology", Springer International Publishing AG 2018, D.J. Casa (ed.), Sport and Physical Activity in the Heat, pp. 15-21 (2018).
Physics in Medicine, Chapter 2, Energy Household of the Body, 2.3 Heat Losses of the Body, University of Notre Dame, Apr. 22, 2004.
ISO/TR 13154:2017, Second Edition: Medical electrical equipment—Deployment, implementation and operational guidelines for identifying febrile humans using a screening thermograph, International Organization for Standarization, ISO/TR 13154:2017(E).
Bodzenta et al., Quantitative thermal measurement by the use of scanning thermal microscope and resistive thermal probes, J. Appl. Physics, vol. 127, pp. 1-20 (Jan. 2020).

* cited by examiner

SYSTEMS AND APPROACHES FOR IMPROVING ACCURACY OF TEMPERATURE MEASUREMENTS USING THERMAL IMAGING

CROSS-REFERENCE TO RELATED APPLICATION

This application claims the benefit of U.S. Provisional Application No. 63/001,081, filed on Mar. 27, 2020, 63/013,131, filed on Apr. 21, 2020, and 63/121,749, filed on Dec. 4, 2020, the contents of which are herein incorporated by reference in their entirety.

FIELD OF THE DISCLOSURE

The present disclosure generally relates to thermal imaging and, more particularly, to systems and approaches for acquiring accurate temperature measurements using thermal imaging systems.

BACKGROUND

Thermal imaging is a sensing method for non-contact measurement of temperatures of thermally emissive objects. Thermal imaging devices detect radiation emitted by objects by sensing infrared photons and identifying the flux thereof. By using multiple sensing and focusing elements, the thermal photon flux from separate solid-angular fields of view can be obtained in a similar manner as visible-light cameras. As a result, an image of the temperature of objects being captured is generated. Such systems may be used in temperature sensing devices for use in healthcare and other facilities where it is of particular importance to quickly, accurately, and repeatedly determine temperatures of subjects. More specifically, such systems may be used to detect elevated core body temperatures in subjects to infer the possible presence of infectious diseases.

Many current systems are incapable of routinely providing sufficient detectability of actual elevated core body temperatures above a widely-accepted threshold of 38° C. (100.4° F.) due to the need for care in acquiring, analyzing and interpreting the sensed measurement. Further, many current systems do not include an accurate reference target or lack sufficient resolution to provide an accurate reading at the required operational distance. Further still, many current systems fail to correct for any effects of the ambient environment or human physiology on the measurement. Typically, in order to accurately (e.g., to approximately ±0.5° C. or better) remotely measure a core body temperature, a thermal imaging system having a surface temperature accuracy of ±0.5° C. or better must be combined with calibrations for the effects of the environment and physiology on the surface temperature. To obtain surface temperature measurements of the required accuracy, either a) a highly uniform thermal image sensor having a corresponding accuracy; or b) a highly uniform thermal image sensor, combined with a reference illumination source itself being highly accurate are needed. Typical highly uniform thermal image sensors having a corresponding accuracy use costly components such as cooled sensors, and as such may not be readily available in healthcare facilities.

When considering the second scenario that uses a highly uniform thermal image sensor combined with a reference illumination source, a properly functioning thermal imaging camera, accurate calibration mechanism or system, and a controlled area are needed to obtain accurate temperature measurements. With regards to camera specifications, a camera having an adequate resolution, uniformity, and stability are needed. The calibration mechanism or system provides a temperature reference and greatly improves accuracy and stability. As an example, in systems that do not utilize a temperature reference calibration mechanism or system, thermal imaging cameras may be accurate to within approximately ±2° C. or in some examples, to within approximately ±1° C. Generally, the combination of a uniform thermal image sensor with a reference illumination source is necessary to reach the required sensor accuracy. While it is possible to reach ±0.5° C. accuracy with a calibrated thermal image sensor alone, such systems are not widely available at this time. Thus in most cases, the normally-available thermal image sensor accuracy values are too large to accurately determine if the temperature reading falls above or below certain thresholds (e.g., those indicating a fever, such as 100.4° F.) due to a combination of the variability of normal human body temperatures, variability in physiology, and the desire to constrain false positive detections below a reasonable level. More specifically, a system having an accuracy of approximately ±1° C. will only reliably detect elevated body temperatures above approximately 102.2° F., and a system having an accuracy of approximately ±2° C. will only reliably detect elevated body temperatures above approximately 104.0° F., which is far beyond a useful temperature measurement when detecting fevers in subjects. Ideally, systems should be capable of reliably detecting body temperatures around approximately 100.4° F., which requires a surface temperature accuracy of ±0.5° C. and additional calibrations to limit the effects of physiology and the environment below a comparable amount (±0.5° C.).

SUMMARY

Embodiments within the scope of the present disclosure are directed to a temperature detection system that includes a housing, a thermal imaging system at least partially disposed within the housing, a reference illumination system operably coupled with the housing and a data correction system communicatively coupled with the thermal imaging system and the reference illumination system. The thermal imaging system is configured to capture at least one thermal image of a scene. The reference illumination system includes at least one reference calibration unit that is visible to the thermal imaging system. The data correction system is configured to correct at least one error associated with the at least one thermal image of the scene.

In some examples, the at least one reference calibration unit may include first and second reference calibration units. The first reference calibration unit may have a first set point value and the second reference calibration unit may have a second set point value. In some examples, a shutter element may be operably coupled with the thermal imaging system. The data correction system may include a shutter-based nonuniformity correction for the at least one thermal image. In some of these examples, the data correction system may further include an offset and gain uniformization system and a temperature conversion relation. Subsequently, the reference illumination system may generate a plurality of approximate temperature values such that the data correction system calculates global offset and scale values to be applied to each pixel of the captured thermal image to produce accurate temperature values.

In some examples, if a sufficiently accurate thermal image sensor is available (e.g. to ±0.5° C.), the reference illumination system may be disregarded and excluded from both the construction of the device and the data correction system. A sufficiently accurate thermal image sensor may be provided with a shutter-free calibration system, in which case the shutter-based nonuniformity correction may be disregarded and excluded from both the construction of the device and the data correction system.

In some forms, the temperature detection system may additionally include a time-of-flight sensor adapted to determine a distance to the subject. In some examples, the data correction system may include a low-order polynomial equation accepting this distance and outputting a correction factor. Further, in these examples, the data correction system may measure a change in the distance to the subject over a period of time to determine a validity of the at least one captured thermal image. The data correction system may further uses a threshold value to determine the validity of the at least one captured thermal image.

In some examples, a heated and/or cooled probe may be provided. The heated and/or cooled probe may measure an air conductance value. Further, in some examples, an unheated probe may also be provided. The data correction system may use at least one measurement obtained from the heated probe and at least one measurement obtained from the unheated probe to calculate a conductance coefficient. In some examples, the data correction system may further use the measured air conductance value to apply a physiologic correction to the at least one captured thermal image.

In some examples, the data correction system is directed to convert a temperature image to a local pixel radiant intensity offset using parameters determined in a calibration to be suitable for the sensitivity of the device's optical and sensor system to local pixel radiant intensity. The data correction system may then use this offset to reduce local pixel radiant intensity artifact.

In some examples, an unheated ambient air temperature probe measuring the local air temperature may be provided. The data correction system may use a low-order polynomial accepting at least one measurement obtained from the air temperature probe to calculate an ambient temperature dependence of the surface temperature measurement and thereby correct the surface temperature for ambient temperature effects including emissivities and residual offsets in the system.

In some examples, the data correction system sequentially receives a frame from the first reference calibration unit and the second calibration unit and interpolates the received thermal data. Further, in some examples, a third reference calibration unit may be provided that is visible to the thermal imaging system when the first and second reference calibration units are in a standby state.

BRIEF DESCRIPTION OF THE DRAWINGS

The above needs are at least partially met through provision of the systems and approaches for obtaining temperature measurements using thermal imaging described in the following detailed description, particularly when studied in conjunction with the drawings, wherein.

Figure 1:
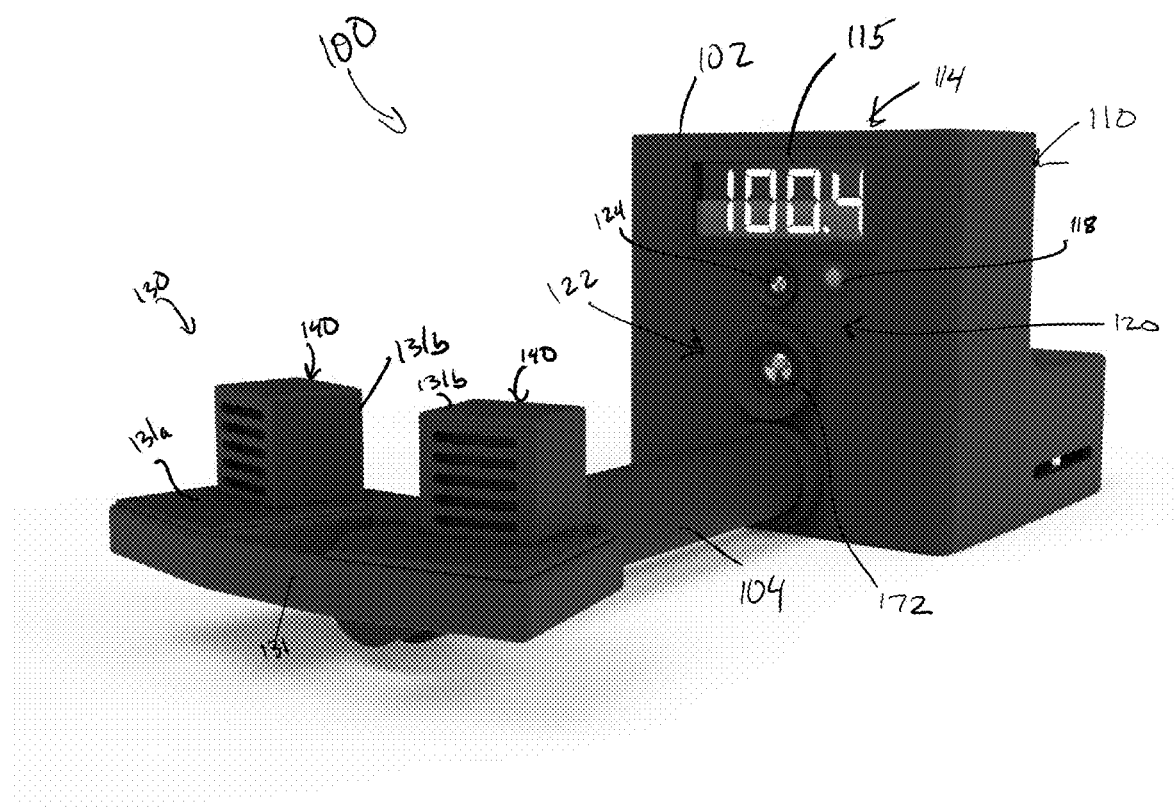
FIG. 1 illustrates a front side perspective view of an example thermal imaging device in accordance with various embodiments.
Figure 2:
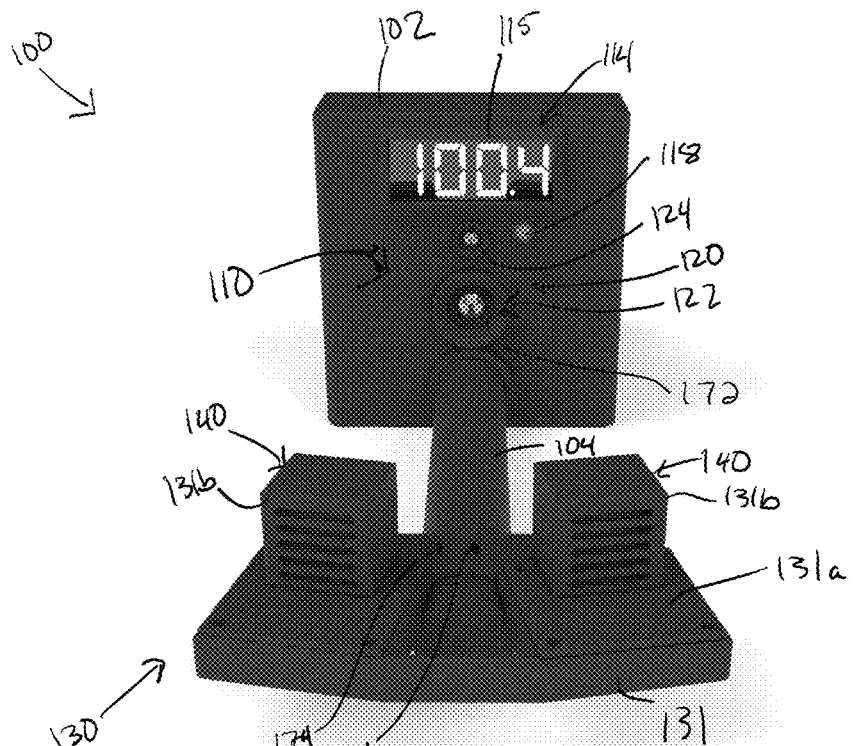
FIG. 2 illustrates a front perspective view of the example thermal imaging device of FIG. 1 in accordance with various embodiments.
Figure 3:
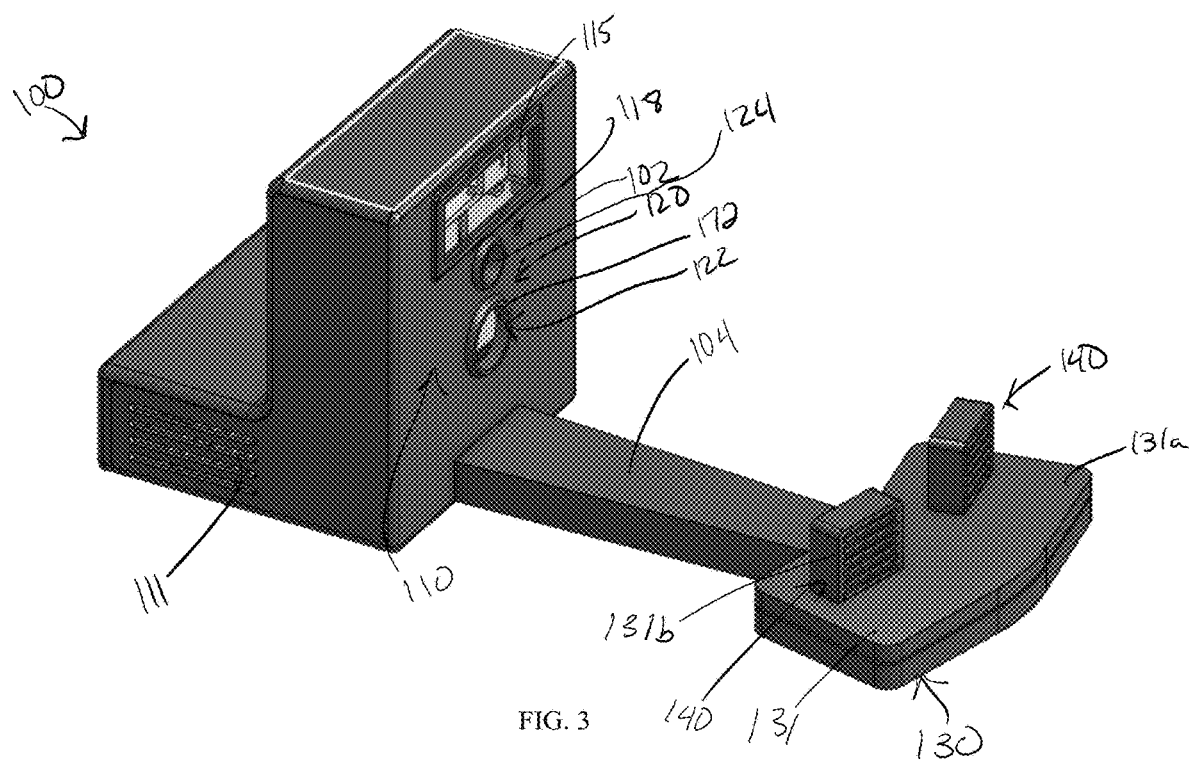
FIG. 3 illustrates a front side perspective view of the example thermal imaging device of FIGS. 1 & 2 in accordance with various embodiments.
Figure 4:
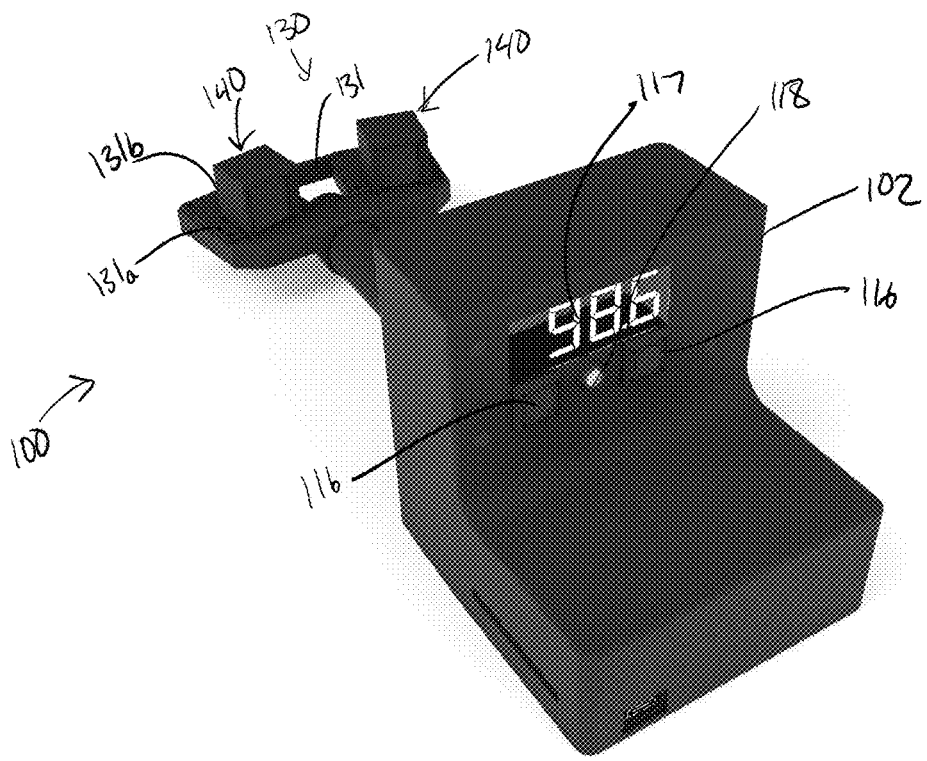
FIG. 4 illustrates a rear perspective view of the example thermal imaging device of FIGS. 1-3 in accordance with various embodiments.
Figure 5:
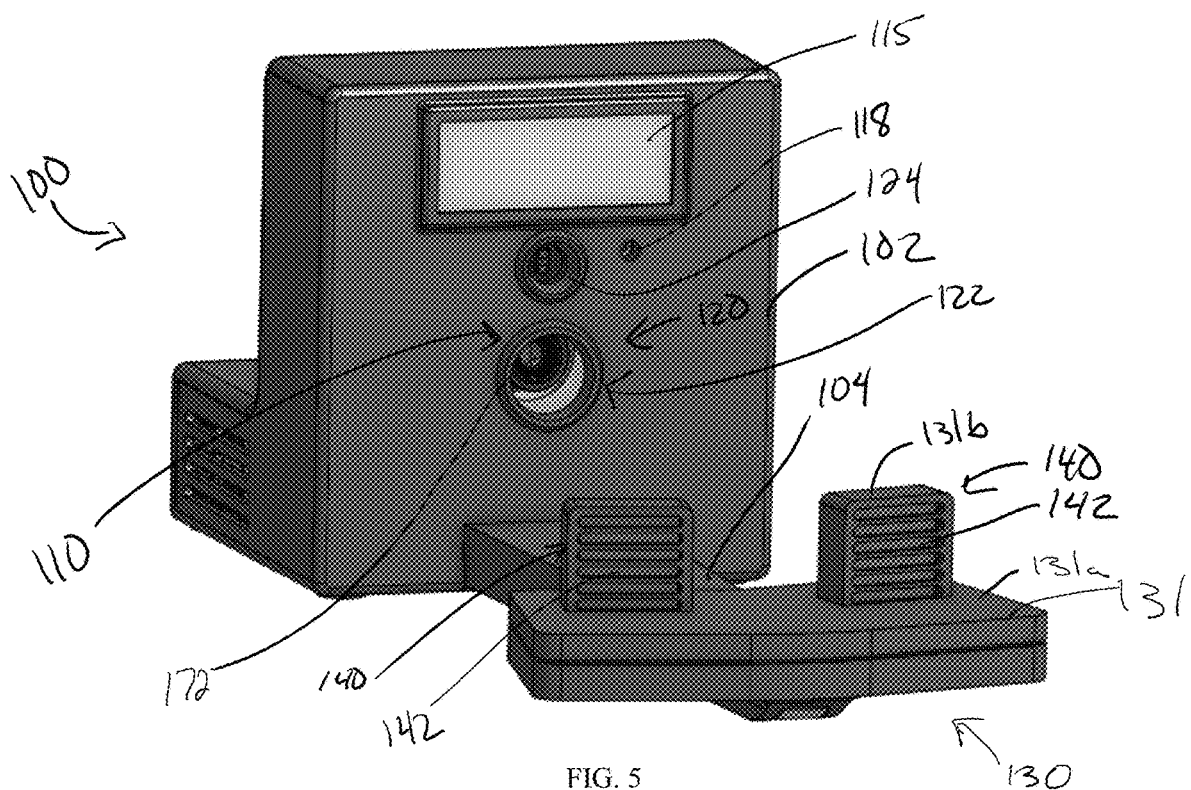
FIG. 5 illustrates a front side perspective view of the example thermal imaging device of FIGS. 1-4 in accordance with various embodiments.
Figure 6:
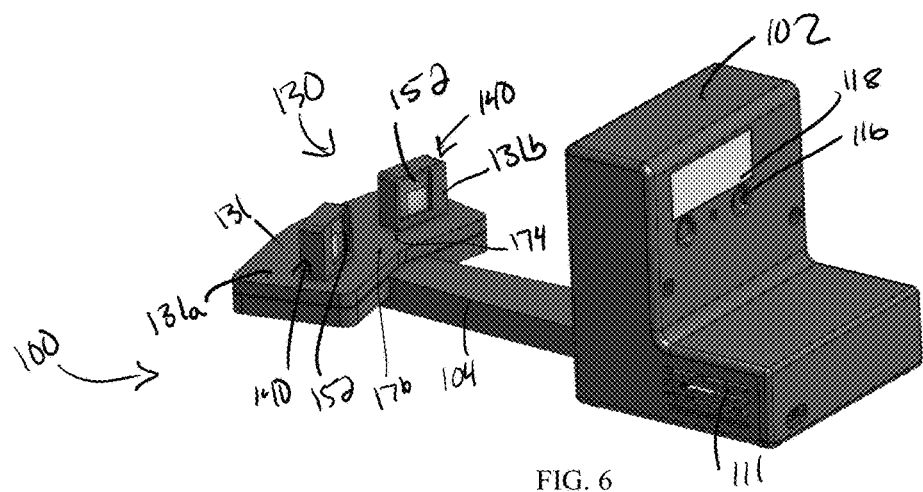
FIG. 6 illustrates an example rear side perspective view of the example thermal imaging device of FIGS. 1-5 in accordance with various embodiments.
Figure 7:
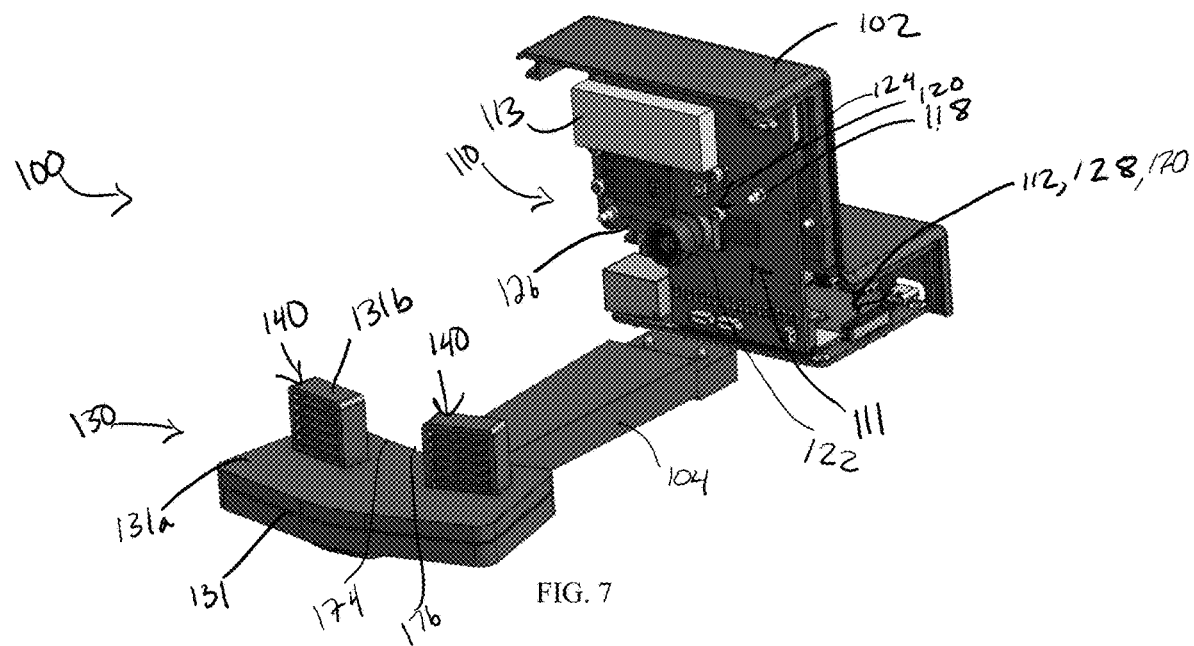
FIG. 7 illustrates an example front side perspective view of the example thermal imaging device of FIGS. 1-6 having a portion of a housing removed therefrom in accordance with various embodiments.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Pursuant to these various embodiments, systems and approaches for thermal imaging provide for thermal image acquisition in a repeatable manner. The thermal imaging device provides for the efficient determination of distance and the use of the distance determination to reduce a calibrated distance-dependent effect on the temperature measurement to generate a more accurate temperature measurement. Further, the systems and approaches described herein may determine and reduce spatial temperature non-uniformity arising from optical focusing elements. Further still, the systems and approaches described herein may determine ambient total heat transfer coefficients or equivalents and use of same to produce a more accurate body temperature measurement. Additionally, approaches for determining the reduction in measured temperature due to insufficient pixel resolution on target, or spot size, and correction for this effect are described that produce a more accurate temperature measurement. Systems incorporating multiple calibration references may use a shutter-based nonuniformity correction, an uniformization of gain across all pixels and a temperature conversion relation to substantially reduce calibration costs, which, in some examples, can be a significant portion of the total cost of the finished assembly. Additionally, calibration reference designs are described that can be integrated with the non-uniformity shutter corrections or otherwise to produce references that expose all or substantially all pixels to the calibration surface radiators, such that a calibration for gain uniformization is no longer needed and the non-uniformity correction is integrated with the reference exposures. It should be appreciated that the embodiments, systems and approaches may be applied to measurements of a variety of objects, including living organisms or inanimate or powered objects.

Turning to the Figures, an example temperature detection system 100 for determining a surface temperature is provided. The temperature detection system 100 includes a housing 102, a thermal imaging system 110 at least partially disposed within the housing 102, an arm 104 operably coupled with and extending from the housing 102, and a reference illumination system 130 operably coupled with the arm 104. The temperature detection system 100 may be disposed in any room or other environment having a reasonable ambient temperature (e.g., between approximately 10° C. and approximately 35° C.) and humidity with minimal forced air, as moving air may impact the accuracy of the temperature detection system 100. The temperature detection system 100 may additionally include a visible camera (not illustrated) to assist with the measurement.

The thermal imaging system 110 includes a computing device 111 operably coupled with a number of user interface elements 114 and a number of data collection elements 120, each of which may be at least partially disposed within and/or otherwise coupled with the housing 102. For example, the computing device 111 includes a controller or processor 112 and a non-volatile memory 113 having a number of subsystems stored thereon. The user interface elements 114 may include a display 115 (e.g., a multi-character LED display), a number of input buttons 116, a clock (which may be equipped with a battery backup feature) 117, and any number of indicator lights (e.g., LEDs) 118. The data collection elements 120 may include a thermal image sensor 122, a distance sensor (e.g., a time of flight sensor or rangefinder) 124, an air temperature sensor 126, a reference illumination system controller 128 configured to control operation of the reference illumination system 130, and a data correction system or systems 170. Other examples of suitable components are possible. In some forms, the thermal imaging device 100 is contained in a single housing, but in other examples, components of the device 100 are contained in multiple housings. Further, in some examples, a separate handheld computing device such as a cellular telephone, tablet, or any other device may be utilized. It is appreciated that the device 100 may include any number of additional components such as data ports, power supplies, transmission modules, mounting mechanisms, and the like.

The controller 112 may be any computing device capable of reading and executing any number of computer-readable instructions and executing arbitrary processing operations. The controller 112 may be a processor or processors, and may be in communication with any number of components such as the user interface elements 114 and data collection elements 120. These additional components may be located on a common reference substrate or circuit board or may be located on an electrically- or optically-connected circuit board. The controller 112 is adapted to control operation of the user interface elements 114, the data collection elements 120, and any other additional components, as will be described in greater detail below.

The computer-readable instructions may be contained in a non-volatile storage medium or a separate connected non-volatile storage medium 113 and direct the processing circuitry to execute code providing various functionality referred to as the operating system. Operating systems are components of computing devices well-known to those skilled in the art and thus will not be discussed in further detail for the sake of brevity. The operating instructions may be complemented by a standard-based application programming interface (API) that provides an extensible model that may be expanded and reconfigured to perform an arbitrary sequence of application instructions even when the sequence of processing is not presently known. The API provides abstractions of various processing capabilities and functions. The functionality provided by software APIs is well-known to those skilled in the art, and thus will not be discussed in further detail.

The reference illumination system controller 128 and the data correction systems 170 may be stored on the non-volatile memory module 113. In other embodiments, the reference illumination system controller 128 and the data correction systems 170 may be located remotely from the device 100 (e.g., on a server), and may communicate with the controller 112 via any known communication method using a communication module.

The display 115 may be any type of output visible-light display system such as, for example, a liquid crystal display (LCD) or other display device such as a TFT display. The display 115 may be coupled with a touchscreen interface for combined display and touchscreen user input. The input buttons 116 may be any type of component or components which allow the operator to interact with the device 100. In some examples, the input buttons 116 may be any number of buttons, switches, toggles, actuators, and the like which are coupled with the device 100. In some forms, the input buttons 116 may also be icons or buttons displayed on the display 115.

The thermal image sensor 122 collects the radiance emitted by the object per unit solid angle focused onto individual pixels, referred to as the radiant intensity, which is independent of distance to the object. The thermal image sensor 122 may have a resolution of at least 80×60 pixels and a FOV no greater than 25 degrees, which may be suitable for subject distances up to approximately 5 feet. The thermal image sensor 122 may use a higher resolution and wider FOV lens or narrower FOV lens to obtain suitable resolution on target for longer distances.

To obtain sufficiently accurate object surface temperature, an external temperature reference source (ETRS) or reference calibration unit 140 is often used. Generally, the ETRS must have a known emissivity, a sufficiently large uniform region (pixel sufficiency) and a known, stable temperature close to the target temperature, where the stable temperature is known at least as well as the desired accuracy of the measurement (maximum total accuracy within ±0.2° C., maximum stability and drift of ±0.05° C.). The ETRS provides an object presenting a known thermal emission, which can be used to adjust the output of the thermal imaging system 110 with a linear correction. This is straight-forward to apply because calibrated thermal imaging systems rely on a linearizing calibration that converts thermal emission that scales by the fourth power of temperature (and other factors) to a value that scales with temperature (and typically is within ±2° C. of the temperature for a desirable calibration). Ideally, the ETRS should have a stable temperature within a few degrees of the expected subject temperature at the desired location (e.g., at the inner canthus, or near the tear duct) of around 30° C. to 36° C., because the resulting correction is most accurate when the actual ETRS and actual canthus temperatures are the same (assuming emissivity corrections for both), and less accurate the further these are from each other due to residual inaccuracy in the camera linearization.

The ISO technical reference guidelines for human body temperature measurement specifies a very high emissivity that can be challenging to reach and to maintain over time as a consequence of surface contamination, but as long as the distribution of object temperatures seen in the scenario facing the ETRS and the subject are comparable, and the ETRS temperature is comparable to the actual target temperature, it is simpler to use the same emissivity as expected for the target (0.98 is a typical estimate for the canthus) and a linear correction, otherwise an emissivity correction must be used to account for different reflected temperatures and the emissivity of each object.

Generally, the reference illumination system 130 is suspended or otherwise mounted via the arm 104 such that it is positioned near the subject's face while being set to a known temperature to act as a reference value. In some cases, said reference illumination system 130 is positioned above where the tallest subjects' head could reach, and in some systems, the thermal imaging system 110 may be rotated 90° from the more conventional horizontal-wide format such that the field of view is taller than it is wide, and hence the reference illumination system 130 may be easily observable and out of the way and out of reach of subjects. The reference illumination system 130 is a uniform and highly emissive source that is stable for extended periods of time, and is accurate to approximately ±0.3° C. or better. In some examples, the reference illumination system 130 is accurate below approximately 0.5° C. while having a uniformity below approximately 0.15° C. Further, the reference illumination system 130 may have better than approximately 0.2° C. uniformity and approximately 0.2° C. stability while having an emissivity of approximately 0.95 or better, and preferably approximately 0.98. As previously noted, in some examples, the reference illumination system 130 may be in the form of an ETRS or "blackbody" that incorporates thermal physics to determine exactly what parameters are needed to obtain desired uniformity, and stability.

The reference illumination system 130 is operably coupled with the arm 104 and includes a circuit board 132 and any number (e.g., one, two, or more) reference calibration units 140 operably coupled therewith such that the circuit board 132 is at least partially constructed from a solid metal embedded therein. The reference illumination system 130 is disposed within a housing 131 including a base portion 131a and an upper portion 131b that accommodates the reference calibration units 140. In some examples, copper pucks having gold plating on all sides may be used that include a high emissivity coating on one side to form the outer sides of the ETRS "sandwich". In other examples, the circuit board 132 may be a small commodity circuit board constructed from a thermally-conductive metal (e.g., aluminium or copper) to a high precision at low cost, thereby allowing a precise temperature sensor to be integrated thereon via a highly thermal coupling. The reference calibration unit 140 is visible to the thermal imaging system 110 (i.e., disposed within the FOV of the thermal image sensor 122). In use, the reference calibration unit 140 of the reference illumination system 130 is set to a desired reference temperature, and the thermal imaging system 110 senses the emitted thermal signal for use when determining a temperature of a subject.

In examples where the circuit board 132 is constructed from copper, an approximately 1.2 mm thick board may be used, and in examples where the circuit board 132 is constructed from aluminum, an approximately 1.6 mm thick board may be used to obtain proper stability of the reference emissions. Other thicknesses may be used depending on the desired stability, uniformity, and size of the ETRS surface.

With particular reference to FIGS. 10-24, the reference calibration unit 140 can include a first metallic shim 142 having a first (i.e., an inner) side 142a and a second (i.e., an outer) side 142b, a thermoelectric cooler module 146 having a first side 146a and a second side 146b, a temperature sensor 150, a second metallic shim 152 having a first (i.e., an inner) side 152a and a second (i.e., an outer) side 152b. The first and second metallic shims 142, 152 provide the visibly-exposed surface, and may be in the form of a disk or other comparable geometry (e.g., a rectangle, oval, or other shape) having a thickness smaller than the two perpendicular dimensions. The first and second metallic shims 142, 152 have a specified emissivity. The internal conductivity of this disk must be as high as possible with reasonable materials in order to achieve temperature uniformity, for which aluminum is typically sufficient, although copper can be preferred due to its higher conductivity and thermal density. This disk is as small in diameter as necessary for pixel sufficiency, having sufficient thickness to provide thermal capacitance to dampen transients induced by changes in heating or air temperature while providing sufficient uniformity.

Generally, the reference calibration units 140 may be constructed by thermally conductively coupling the first metallic shim 142 with the thermoelectric cooler module 146 and temperature sensor 150. The at least inner side of the first metallic shim may be plated with an Electroless-Nickel immersion Gold or an Electroless Nickel Electroless Palladium Immersion Gold process to provide an area for solder bonding to easily thermally mate the thermoelectric cooler module 146 to the metallic shim 142. The outer side of the first metallic shim 142 is then coated with a known high emissivity material in a chemical vapor deposition process. The temperature sensor 150 may be operably coupled with the inner or outer side of the first metallic shim 142 film via, in some examples, a thermally conductive epoxy under and surrounding the sensor or the sensor may be part of a circuit which is then bonded using a solder material to the first metallic shim 142. As illustrated in boxes "1" and "2" in FIG. 10, an adhesive 143 (e.g., a gold-plated, polyimide tape) is first applied to an outer portion of the first side 142a of the metallic shim 142 such that a central region of the metallic shim 142 remains exposed.

In some examples, it is desirable for the thermally emissive surface to exist at the immediate surface of the metallic shim 142 to present a uniform temperature. Rather than transforming the surface with complicated processes, a known emissivity surface can applied by means of the adhesive 143. If the adhesive 143 is sufficiently thin, the temperature reduction between the metallic shim 142 and the emissive coating can be sufficiently low as to be either ignored or be corrected by means of a calibration relating ambient temperature and disk temperature to the actual coating surface temperature. In some examples, approximately 16 mm square stickers from Acktar (Kiryat-Gat, Israel) are placed onto the metallic shim 142 prior to assembly, resulting in a highly emissive, cost-effective surface.

Figure 10:
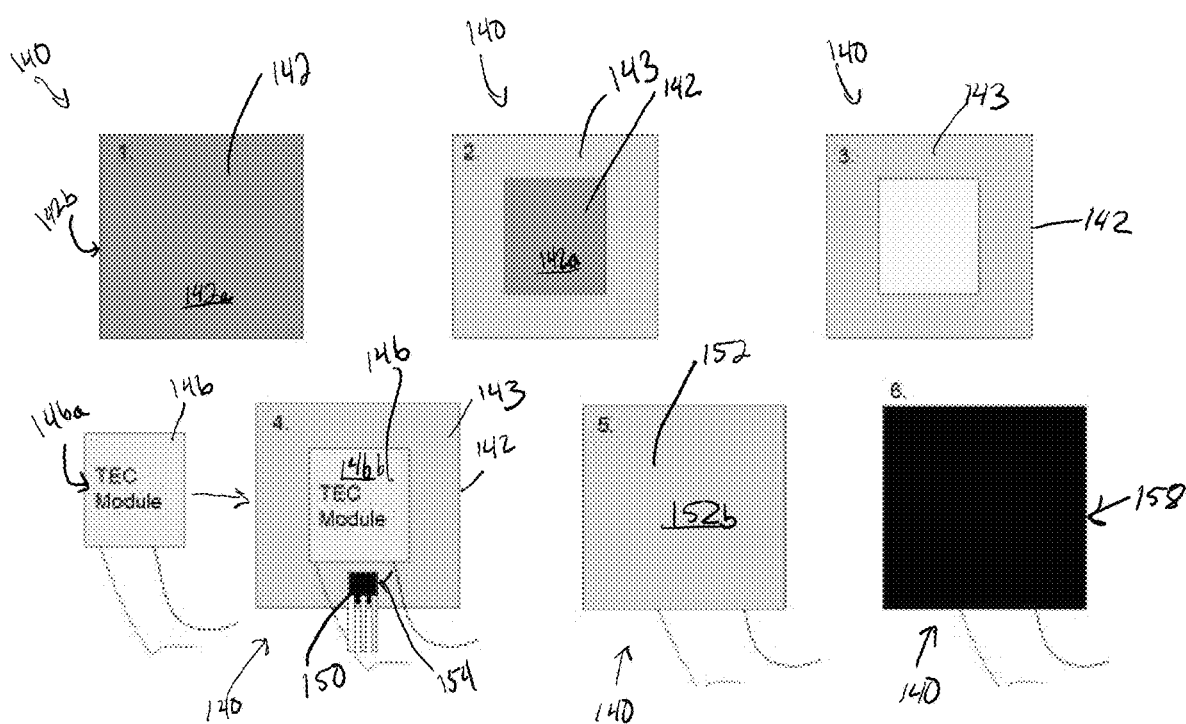
FIG. 10 illustrates an example approach for constructing an example reference illumination system of the example thermal imaging device of FIGS. 1-9 in accordance with various embodiments.
Figure 11:
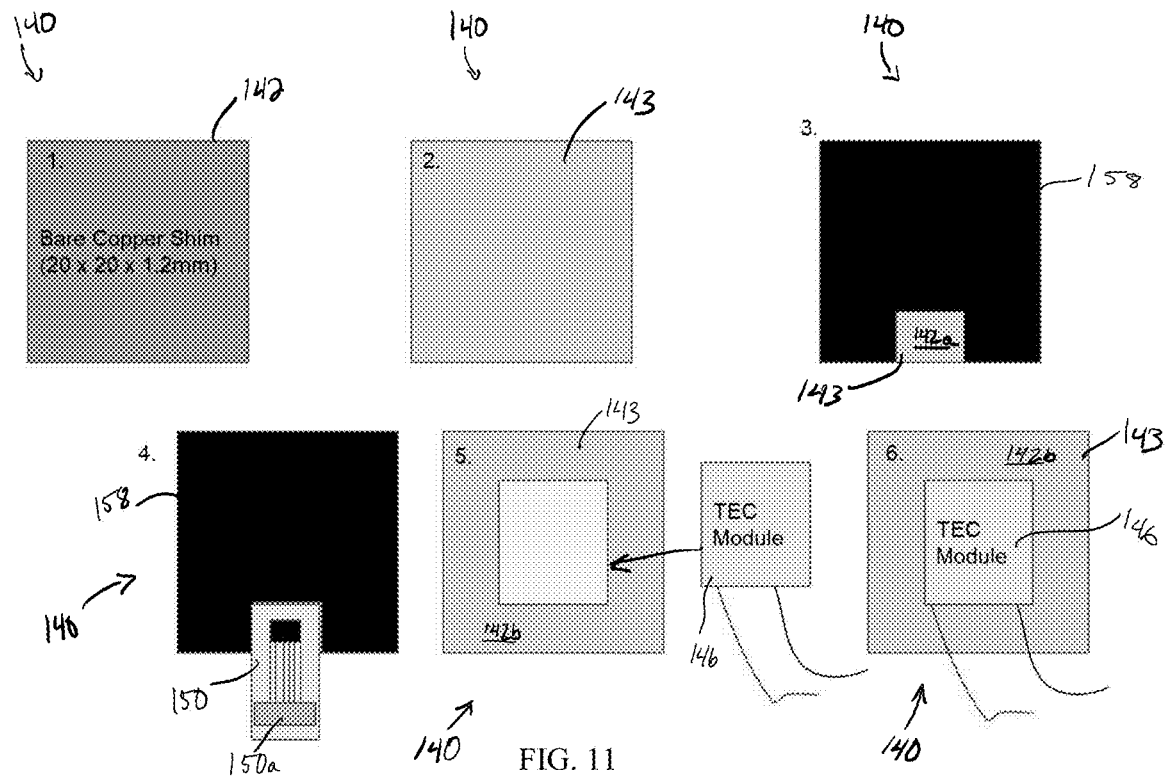
FIG. 11 illustrates an example approach for constructing an example reference illumination system of the example thermal imaging device of FIGS. 1-9 in accordance with various embodiments.

As illustrated in box "3" in FIG. 10, the exposed central region of the metallic shim 142 is tinned or pre-soldered using, in some examples, a low-temperature In52Sn48 solder. The first side 146a of the thermoelectric cooler module 146 may also be pre-soldered, and in box "4" of FIG. 10, the thermoelectric cooler module 146 is coupled with the central region of the first metallic shim 142. The thermoelectric cooler module 146 (or in some examples, a resistive heating element) has a sufficient thickness and surrounding materials of lower conductivity arranged and calculated to limit non-uniformity. If using thermoelectric elements, other relevant components may be arranged, such as a heatsink or heat pipe for the second side 142b (i.e., the cold side), ideally opportunistically directing heat to circuitry which are dissipating heat and thereby lowering the current required to maintain the first side 142a (i.e., the hot side) at the directed temperature.

The temperature sensor 150 is coupled with the first metallic shim 142 at the outer portion thereof (i.e., where the adhesive 143 was applied) using the epoxy material 154. The second side 146b of the thermoelectric cooler module 146 is then covered with a thermally conductive interface material, and in box "5" of FIG. 10, the first side 152a of the second metallic shim 152 is pressed to the second side of the thermoelectric cooler module 146. As illustrated in box "6" of FIG. 10, a high-emissivity aluminium-backed tape or coating 158 (e.g., Acktar, Israel) is applied to the second side 152b of the second metallic shim 152. This second side 152b of the second metallic shim will be the "exposed" surface that is visible to the thermal imaging system 110. These last elements (gold plating, solder and emissivity foil) produce an accurate blackbody that has minimal variability.

The reference illumination system controller 128 may be in the form of a proportional-integral-derivative (PID) controller designed for accurate control to drive the temperature of the second side 152b of the second metallic shim using the temperature sensor 150 circuitry coupled with the backside of this "hot side" blackbody surface circuit board. The second side 142b of the first metallic shim 142 (i.e., the cold side, also known as the uncontrolled side) may employ a heat sink in the form of an ENIG mirror reflector that will bounce thermal emitted heat from the hot side off this gold-plated cold side back to the hot side to further enhance stability. This cold side heat sink and its emissive surface is at least as large as the emissive surface on the control side of the reference calibration unit 140 in order to ensure stability across a range of operating temperatures. The upper portion 131b of the housing 131, in which the reference calibration units 140 are disposed, include a number of vents to remove heat therefrom. In one arrangement, a calculation is performed to ensure the vents on the heat sink side of the upper portion 131b are larger than those on the hot side to allow for proper heat dissipation and/or radiation. Accordingly, the present system can maintain the blackbody surface to within 0.01° C. of a desired setpoint.

Turning to FIGS. 11-17, a preferred approach for coupling the reference calibration unit 140 with the circuit board 132 are provided. In this preferred embodiment, the circuit board 132 is not bonded to either of the shims 142, 152, but is instead disposed in an assembly (FIGS. 17a & 17b) designed to hold the two metallic shims 142, 152 together about the thermoelectric cooler module 146 and thermal interface material. As illustrated in boxes 1 and 2 of FIG. 11, a bare copper shim 142 receives an ENIG plating of approximately 0.075 to 0.12 microns gold on approximately 3-6 microns nickel. As depicted in box 3 of FIG. 11, an emissivity tape or coating 158 is applied to one side 142a of the ENIG-plated shim 142, while a lower region remains masked and un-coated. As illustrated in box 4 of FIG. 11, a temperature sensor 150 in the form of a flexible circuit is soldered to the previously-masked region at its sensing end. In some examples, a metal cap 150a is soldered over the sensor tail. Next, in box 5 of FIG. 11, the center pad on the uncoated side 142b of the shim 142 is pre-tinned, and in box 6 of FIG. 11, the thermoelectric cooler (TEC) module 146 is coupled thereto.

Figure 12:
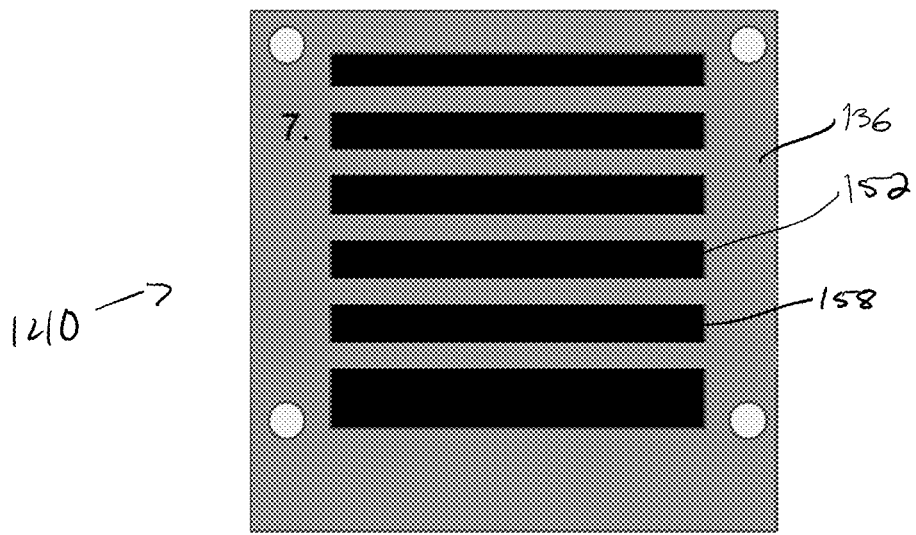
FIG. 12 illustrates a step for constructing the example reference illumination system of FIG. 11 in accordance with various embodiments.
Figure 17A:
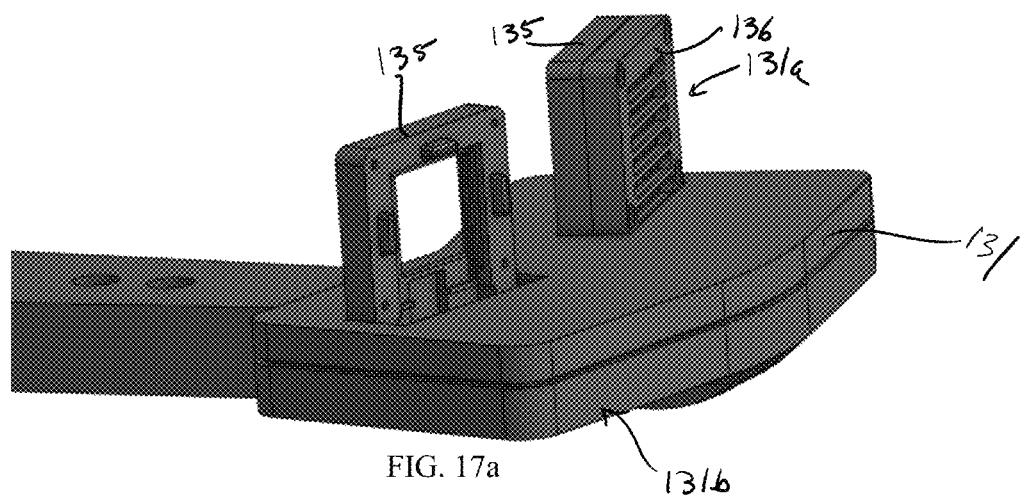
FIG. 17*a* illustrates a perspective view of an example holder for the example reference illumination system of FIGS. 11-15 in accordance with various embodiments.
Figure 17B:
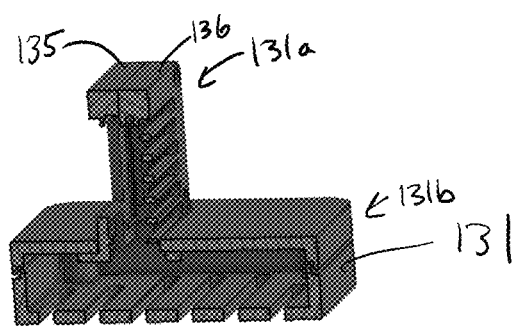
FIG. 17*b* illustrates a section view of the example holder of FIG. 17*a* in accordance with various embodiments
Figure 18:
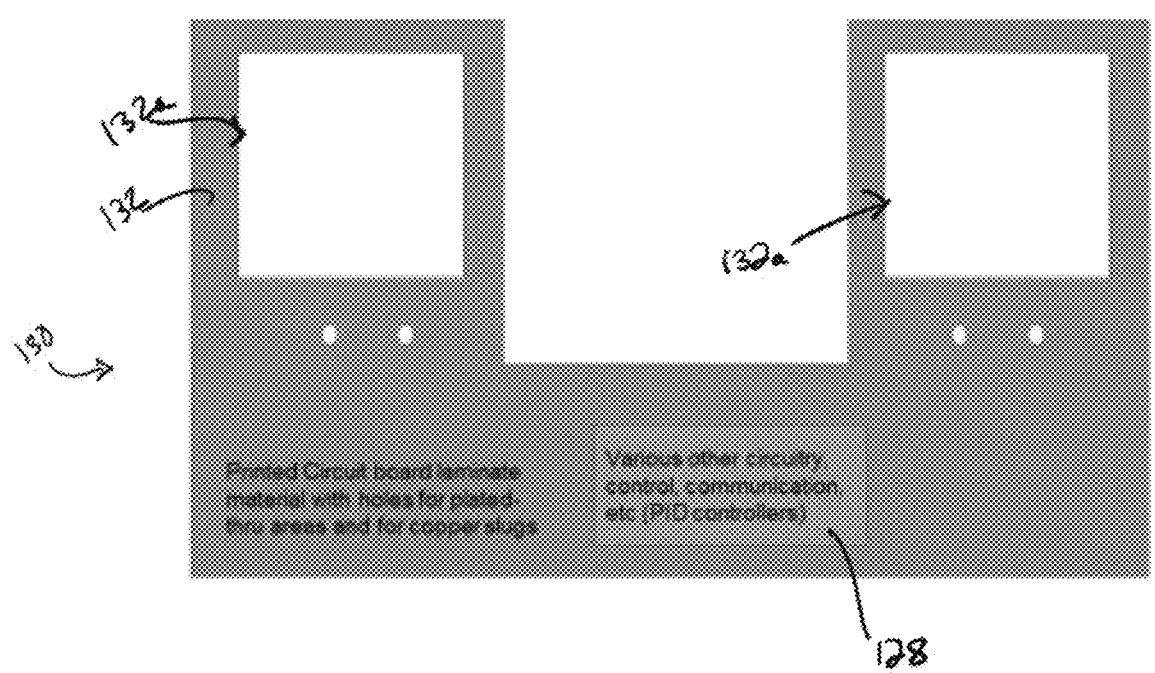
FIG. 18 illustrates a schematic of an example circuit board for use with the example reference illumination system of FIG. 10 in accordance with various embodiments.

Turning briefly to FIGS. 17a and 17b, in some examples, the upper portion 131b of the housing 131 includes any number of frontside holders 135 and backside holders 136. In this example, the frontside holder 135 and the backside holder 136 are coupled together via any number of suitable approaches such as, for example, clips, a friction-fit connection, screws and/or fasteners, and the like. Further, the frontside and backside holders 135, 136 may be retained within the base portion 131a of the housing 131 via any number of suitable approaches. With reference to FIG. 12, the second shim 152 is constructed in a similar manner as boxes 1-3 of FIG. 11 with respect to the first shim 142 (with or without the masked region) and is then placed into the backside holder 136. The second shim assembly 152 may be secured with the backside holder 136 via any number of suitable approaches such as, for example, a friction-fit connection.

Figure 13:
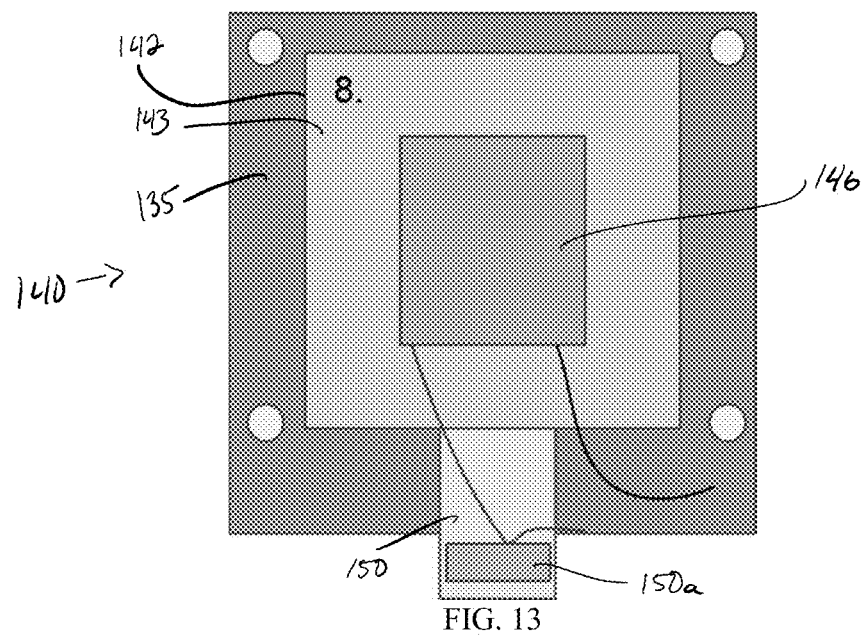
FIG. 13 illustrates a step for constructing the example reference illumination system of FIGS. 11 & 12 in accordance with various embodiments.
Figure 14:
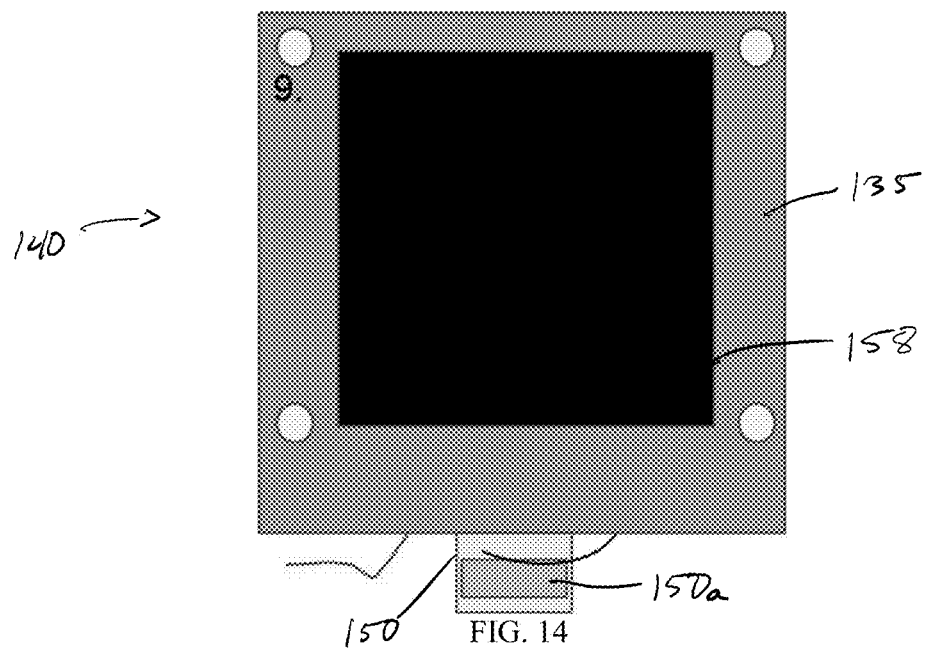
FIG. 14 illustrates a step for constructing the example reference illumination system of FIGS. 11-13 in accordance with various embodiments.
Figure 15:
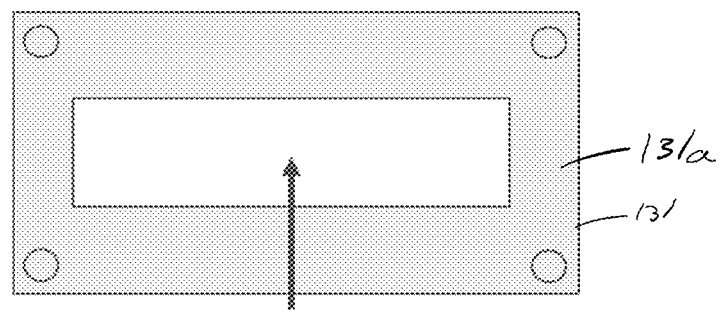
FIG. 15 illustrates a step for constructing the example reference illumination system of FIGS. 11-14 in accordance with various embodiments.
Figure 15:
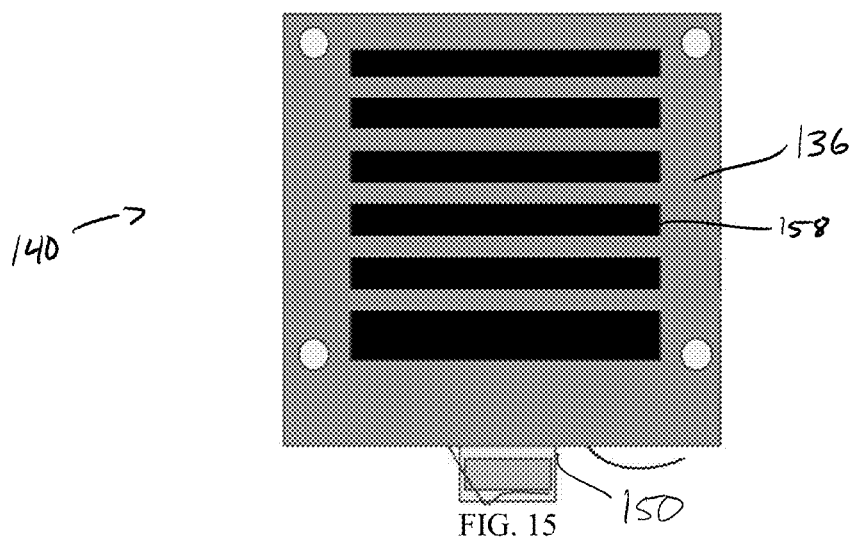
Figure 16:
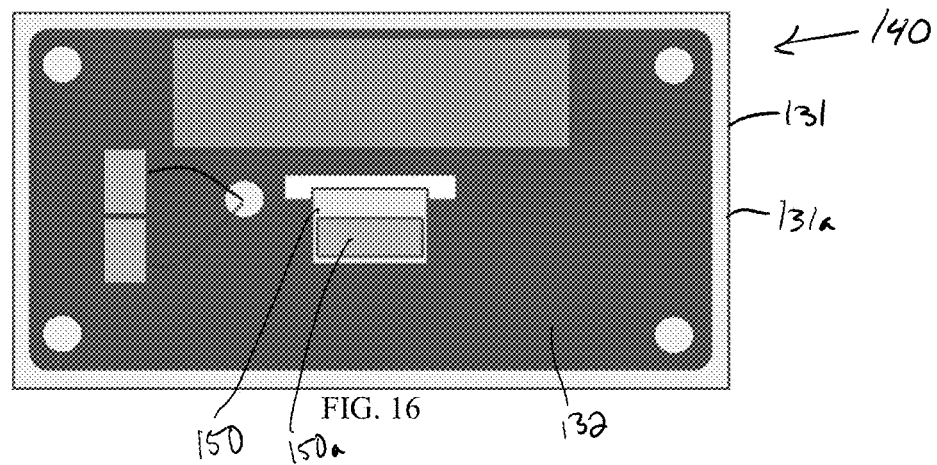
FIG. 16 illustrates a step for constructing the example reference illumination system of FIGS. 11-15 in accordance with various embodiments.

Returning to the first shim 142, in FIG. 13, a thermally conductive interface material is placed on the thermoelectric cooler module 146, and this assembly is then placed into the frontside holder 135 via any number of suitable approaches such as, for example, a friction-fit connection. In FIG. 14, the second shim assembly 152 (coupled with the backside holder 136) is placed on top of the first shim assembly 142, and the frontside holder 135 and the backside holder 136 are coupled together (e.g., via screws) to urge the assemblies together around the thermal interface material. As illustrated in FIG. 15, the assembly 140 is inserted into the base portion 131a of the housing 131, which, as illustrated in FIG. 16, accommodates a circuit board 132 and/or other circuitry, controllers (e.g., PID controllers), communication modules, and the like, and includes openings to receive a portion of the thermoelectric cooler module and wiring.

Figure 19:
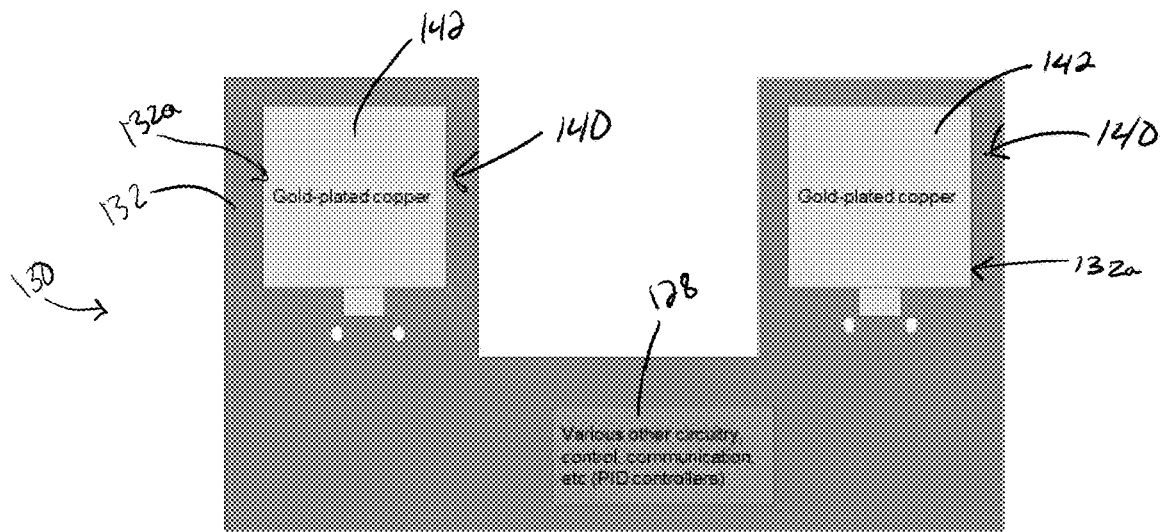
FIG. 19 illustrates a schematic of an approach for constructing the example circuit board for use with the example reference illumination system in accordance with various embodiments.

Turning to FIGS. 18-24, alternative approaches for coupling the reference calibration unit 140 with the circuit board 132 are provided. The circuit board 132 may be at least partially constructed from a laminate material and may include openings 132a for the reference calibration units 140 therewith. The circuit board 132 may additionally include other circuitry 133 such as the above mentioned reference illumination system controller 128. As illustrated in FIG. 19, a portion of the reference illumination system 140 is coupled with the circuit board 132. More specifically, the first metallic shim or slug 142, constructed from a gold-plated copper or similar material, is positioned within the opening 132a and bonded with the circuit board 132. In some examples, during processing, plating may be extended to nearby areas of the circuit board 132 to receive the temperature sensor 150. In other examples, the metallic shim or slug may be pure copper (or aluminium) and plating may be applied by the circuit board manufacturer.

Figure 20:
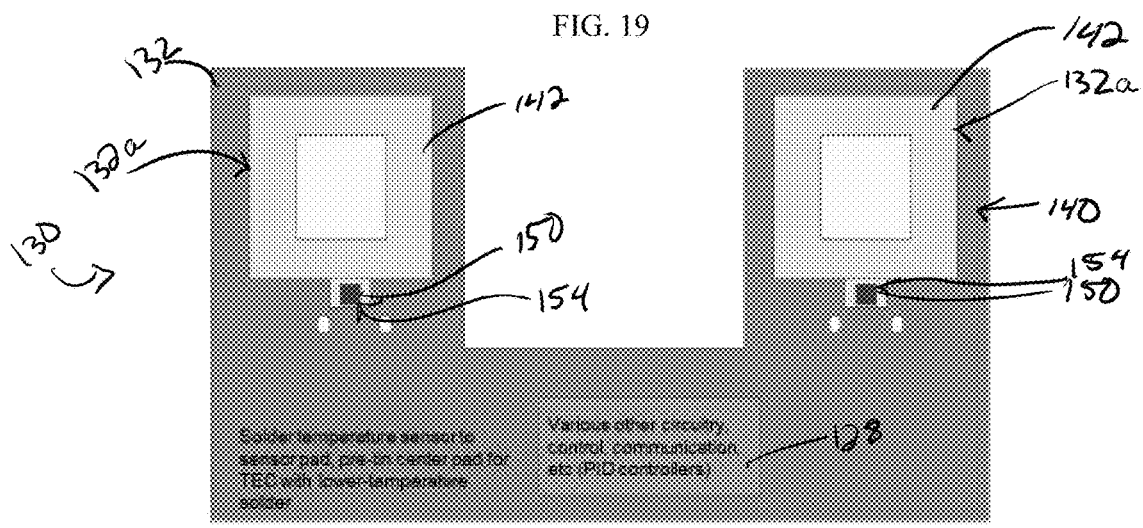
FIG. 20 illustrates a schematic of an approach for constructing the example reference illumination system of FIGS. 18 & 19 in accordance with various embodiments.
Figure 21:
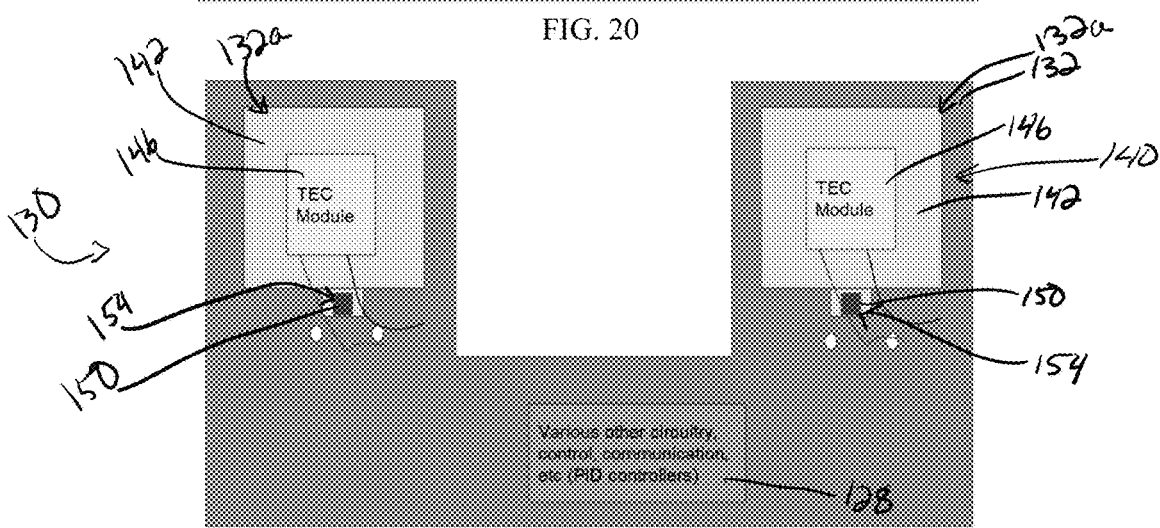
FIG. 21 illustrates a schematic of an approach for constructing the example reference illumination system of FIGS. 18-20 in accordance with various embodiments.
Figure 22:
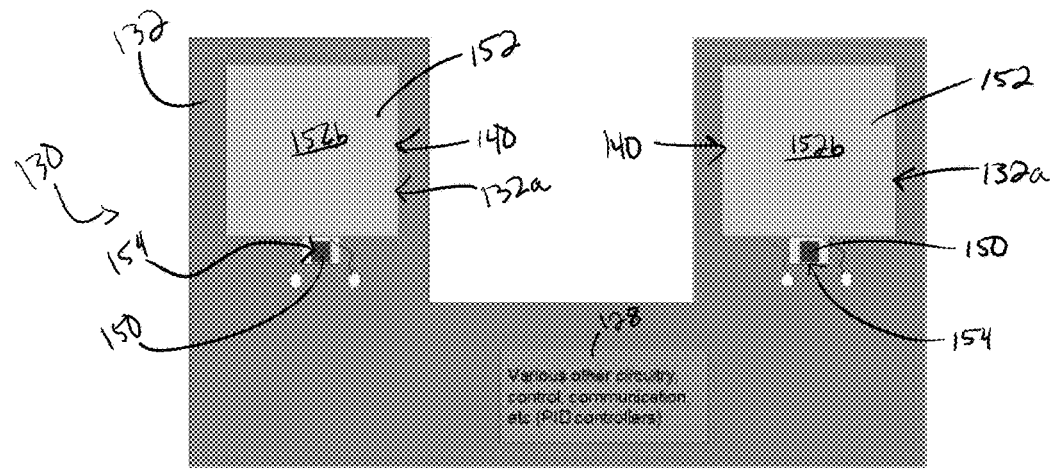
FIG. 22 illustrates a schematic of an approach for constructing the example reference illumination system of FIGS. 18-21 in accordance with various embodiments.
Figure 23:
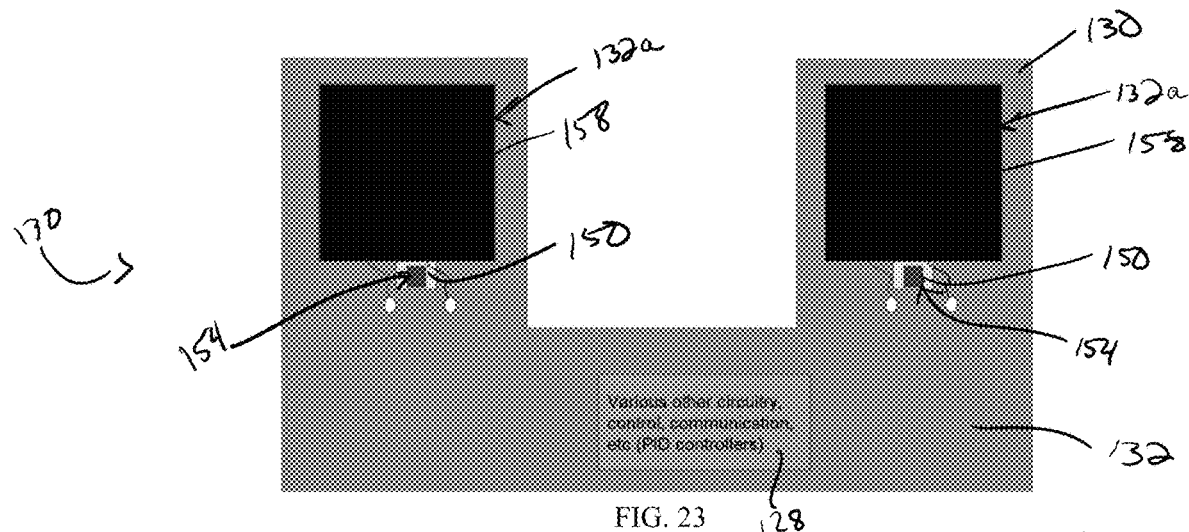
FIG. 23 illustrates a schematic of an approach for constructing the example reference illumination system of FIGS. 18-22 in accordance with various embodiments.

As illustrated in FIG. 20, the temperature sensor 150 is soldered to the sensor pad formed on the circuit board 132, and the central pad of the metallic shim 142 is pre-soldered to receive the thermoelectric cooler module 146. As shown in FIG. 21, the thermoelectric cooler module 146 is soldered to the first metallic shim 142, and the power leads 146a thereof may be soldered to the openings 132a of the circuit board 132. As illustrated in FIG. 22, the second metallic shim 152 (also referred to herein as the top heatsink) is coupled with the thermoelectric cooler module 146. As illustrated in FIG. 23, the high emissivity coating or tape 158 is applied to the exposed surfaces (i.e., the second side 152b of the second metallic shim and the second side 142b of the first metallic shim 142).

Figure 24:
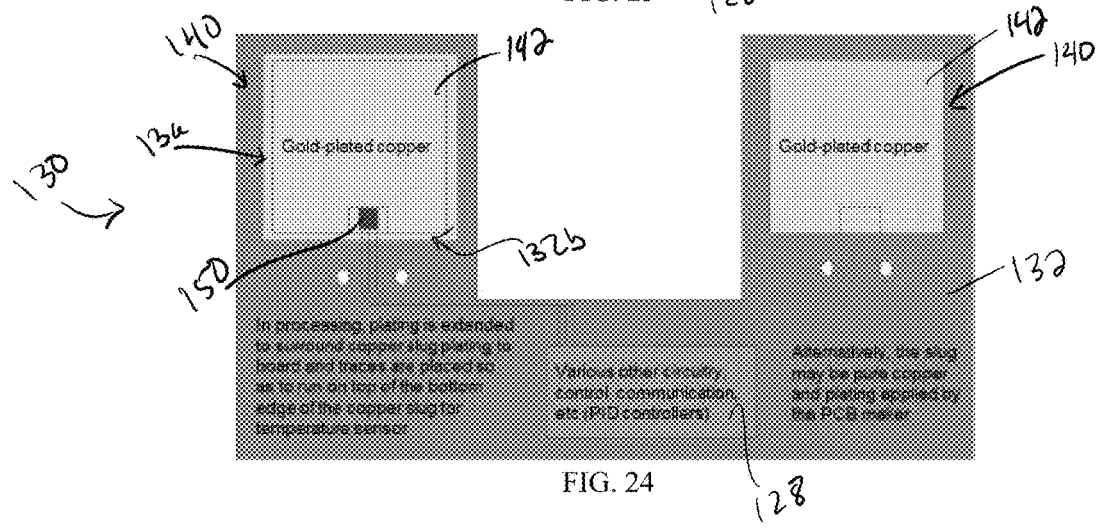
FIG. 24 illustrates a schematic of an approach for constructing the example reference illumination system of FIGS. 18-23 in accordance with various embodiments.
Figure 25:
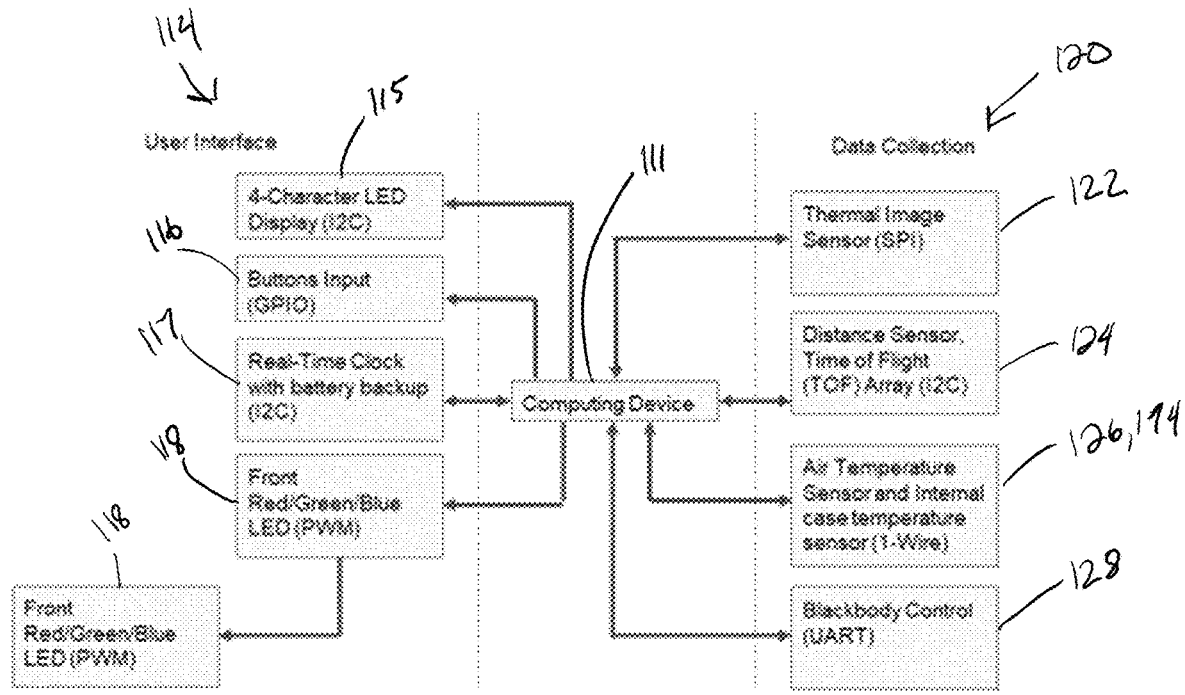
FIG. 25 illustrates a schematic of an example computing device for the example thermal imaging device of FIGS. 1-24 in accordance with various embodiments.
Figure 26:
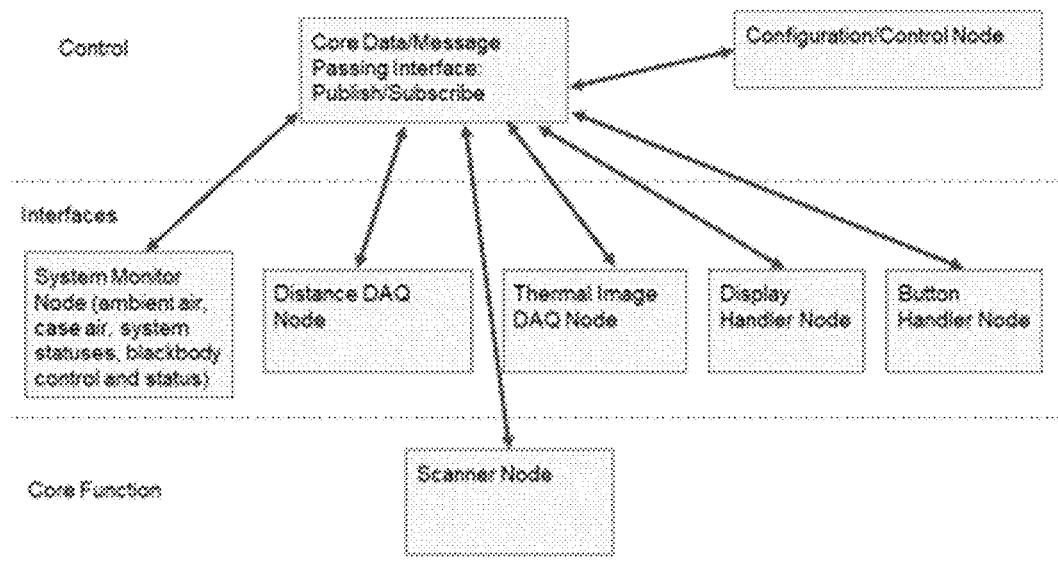
FIG. 26 illustrates a process diagram of the example computing device for the example thermal imaging device of FIGS. 1-25 in accordance with various embodiments.

As illustrated in FIG. 24, an alternative approach for coupling and constructing the reference calibration unit 140 with the circuit board 132 is provided. In this approach, during processing, plating is extended to surround the first metallic shim 142 (i.e., the copper slug) to the circuit board 132 and traces 132b are placed so as to run on top of the lower edge of the metallic shim 142 for the temperature sensor 150. Alternatively, the slug may be pure copper and the plating may subsequently be applied by the circuit board manufacturer.

The power deposited by the thermoelectric cooler module 146 during the heating cycles is limited to below that producing a detectable nonuniformity at the surface, which can be determined using the conductivity and capacitance of the disks and the pattern of the heating elements in a computational simulation of the heating for a range of heating powers. The first metallic shim 142, having its second side 142b with a known emissivity coating, is held by a low-conductivity material to the disk housing or the circuit board 132, which incorporates an insulative shell either of separate material or of a nonconductive PCB material. Transients induced by air may be reduced by adding a directional tube over the emissive surface.

The reference calibration units 140 are positioned in the upper portion 131b of the housing 131 to obscure a small, pre-selected portion of the imaging field of view at a fixed position and distance relative to the thermal imaging system 110. The upper portion 131b of the housing 131 may include openings on each side thereof to allow the reference calibration units 140 to be "seen" by the thermal imaging system 110. In some examples, if the reference illumination system 130 is positioned close to the thermal imaging system 110, it can be mounted so as to fully or nearly fully encompass the full field of view of the thermal imaging scene by being mounted onto a controllably movable actuator, as an adjunct to or potentially in place of a shutter system. Such an approach may be described as an intermittently-exposed reference illumination system as compared with a continuously-exposed reference illumination system 130 that can only be exposed to a partial field of view. In some of these examples (not illustrated), a single PCB containing two reference illumination systems 140 and a hole and potentially an ambient temperature surface is mounted axially to a motor directed to rotate the PCB assembly. The hole, ambient surface and two reference illumination systems 140 are arranged such that they are at different specific angular orientations and the motor and optical or other feedback system are used to control which of the three or four orientations is selected and thus presented to the thermal imaging camera. Alternatively, a sliding arrangement or set of linear actuators can be used to effect a positional instead of a rotational assembly.

The first and second metallic shims 142, 152 may be expensive to source if using traditional machining methods. However, metal-core PCB or coin-in PCB may be readily incorporated into the system 100 and can be mass-produced efficiently at low cost and with little to no loss in accuracy or other requirements. A further detailed manufacturing process will now be described. Generally, the circuit board 132 manufacturing involves the accurate shaping of the substrate at a low cost. Because this shaping is an important part of the manufacturing process, a moderate amount of additional custom shaping is of minimal cost, particularly as compared to traditional machining approaches. Metal core PCBs can be easily adapted to a temperature reference design and in a non-limiting example, a 20 mm circular disk is carved out of Bergquist Copper core PCB stock, with one-sided traces between a small analog temperature sensor on the front side of this disk and a connector, and ENIG-plated copper exposed on the front side and on the backside in a pattern matching a small peltier thermoelectric cooler 146, which is metallized and soldered to this exposed area on the backside. A second PCB with copper core is carved with a larger shape, having an exposed copper area matching the TEC and which is later mated to said TEC with a thermally conductive interface material. This second PCB is the uncontrolled side and contains the controller 128 and any optional readout circuits and connections for the temperature sensor 150 on the first hot side PCB, where said circuitry is cooled by this PCB. The thermal resistance between this second PCB and ambient is controlled such that it will not condense water in ambient air throughout an operating range of temperature and humidity. The thermal resistance between the first PCB and the second is controlled by insulation between them, surrounding the TEC, and the insulation between the first PCB and ambient is provided to ensure uniform temperatures and accuracy at the temperature sensor, with the majority of conductivity through the exposed surface to ambient air through thermal radiation, conduction, and still air convection. Finally, the emissive coating 158 is affixed to the radiative circularly exposed ENIG-plated copper surface of the second metallic shim 152.

Coin-in-PCB is a related technique in which a manufacturer press-fits, plates or otherwise bonds a solid metal element into a cavity removed from a traditional PCB to effect a combination of a traditional PCB and a metal-core PCB. This allows the tight control of the insulative surfaces surrounding the metal disk, the integration of more circuitry that would normally be feasible, due to the cost and other design limitations placed by full metal-core PCB, and most importantly, significant cost reductions compared to metal-core PCB. In an example, a circular copper coin of 15 mm diameter and 1.6 mm thickness with a rectangular notch 5 mm wide and 2.5 mm towards the center removed at a point on the circumference, is placed into a 15 mm circular cavity that is partially milled out of a traditional FR-4 PCB, with an area matching the notch having vias to the underside. A central 10 mm diameter circular region centered on this cavity is milled all the way through, exposing the underside of the coin. The coin is press-fitted and plated, with three of the vias having an annular removal of plating so they aren't electrically conducting to the coin, and said vias and traces ultimately accepting a temperature sensor integrated circuit (IC). A high-emissivity surface is placed on the exposed back side and the front side is soldered with low-temperature solder to the hot side of a TEC, with the cold side of said TEC being soldered to a small heat pipe conducting heat from the PCB to the cold side and maintaining sufficient heat to prevent condensation. Further integration is also benefited by this method, in an example embodiment but not limited to, a PCB containing two reference calibration units 140 and associated control circuitry is arranged with a hole and another uniform area on the PCB such that this PCB can be moved by sufficient increments in order to expose the entire thermal sensor to any of the reference calibration units 140, the hole or other uniform area.

In some examples, the reference calibration unit 140 may experience drift when being used in intermittent exposure assemblies. In these examples, a continuously-visible in-field reference having lesser accuracy requirements than those of the reference calibration units 140 may be used to detect calibration drift and either trigger a calibration event or compensate for the drift until such time as it is desired to trigger a calibration event. A third reference calibration unit may be prepared similarly to the reference calibration units 140 but without any temperature control, rather only a temperature sensor and a smaller metallic shim having sufficient insulation and shielding may be placed at a fixed location to be visible in the corner of the field of view permanently. This third reference unit may be continuously monitored both with the most recent calibrated outputs and with the smaller shim-coupled temperature sensor's output, and deviations between the calibrated thermal image output and the temperature sensor are used to detect deviation. If the output of the thermal image sensor 122 is pixel voltage offset-corrected and gain-corrected for the dependence of gain on the temperature of a microbolometer, this deviation is primarily due to offset from change in internal temperature of emissive surfaces within the optical pathway, and thus, this deviation may be subtracted from all thermal image outputs to retain a calibrated output. If no such gain correction has been determined, then there is a threshold above which it is preferable to trigger a calibration event, and this threshold may be determined by considering the total system error budget and a determination of the sensitivity of the system's gain and offset to temperature, e.g. a drift of up to 1.0° C. may be subtracted, while a deviation greater than 1.0° C. triggers a calibration event. Further, the gain may drift at a lower rate than the offset, particularly in thermal image sensors having poor internal thermal conductivity. Oftentimes, the gain from the most recent intermittent reference calibration unit can be used if no full gain calibration has been made, and the deviation of gain can also be detected by monitoring the integrated temperature sensor of the microbolometer and reacting accordingly.

System stability may be desirable, and phase-change materials can be used to provide this additional stability in place of more expensive electronic control to reduce the impact of transients on the system. In these examples, a phase change material is applied behind the emissive surface element, which can also be modified in shape so as to be flat rather than structured. The heating elements and a new separate set of temperature regulation sensors are embedded within the phase change material, with a further set of temperature regulation sensors embedded in the edge of said phase change material in order to detect the initial solid-to-liquid phase transition. The heating control unit is directed to heat corresponding to a proportional-integral-derivative loop tuned to maintain the sample at approximately half the latent heat of fusion with a time constant adjusted to below that of the total phase change material phase transition time from half the latent heat of fusion (essentially, halfway to melted). Many other configurations are possible, all with the aim of maintaining the phase change material as a buffer as close to the transition temperature as possible. The resulting stability is better than that achievable without considerable additional expense.

In an alternative approach, a number of reference calibration units 140 may be permanently affixed with respect to the system at a fixed position. The reference calibration units 140 may be positioned approximately 10 inches from the thermal imaging system 110, although other distances are possible. It may be necessary to correct for relative closeness of the reference calibration units 140 (described below by distance correction). An example implementation adjusts the setpoint of the close ETRS such that its apparent radiant intensity matches that of a calibration source ETRS placed a further fixed distance away from the thermal image sensor. In this scenario, if for a given pixel's output, there is a dependence on nearby pixel radiant intensity, the setpoint arrived at will be lower than if the close ETRS were placed at a further distance.

Figure 8:
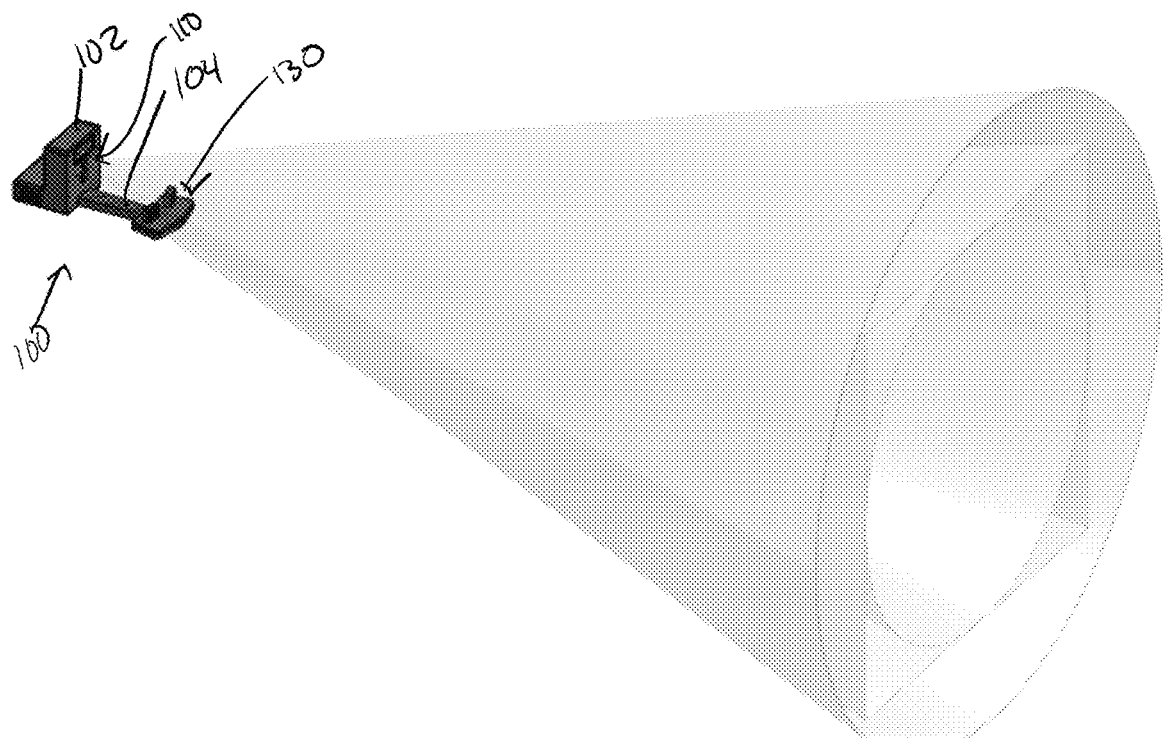
FIG. 8 illustrates an example field of view (FOV) of the example thermal imaging device of FIGS. 1-7 in accordance with various embodiments.
Figure 9:
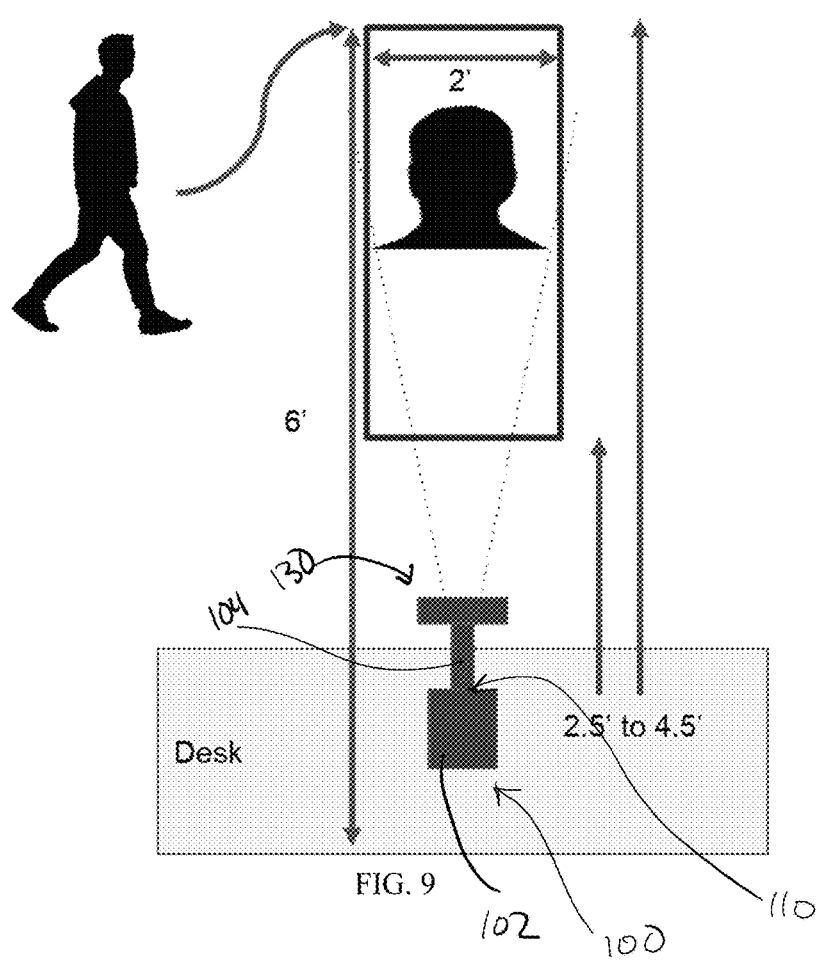
FIG. 9 illustrates a schematic example of a working FOV for the example thermal imaging device of FIGS. 1-8 in accordance with various embodiments.

Use of the thermal imaging device 100 will now be described. More specifically, thermal imaging of key locations on the body (e.g., the inner canthus) typically have few confounds and provide the closest correspondence to a subject's core body temperature, suitable for applying a correction for physiology to arrive at a reliable estimate of core body temperature. It should be noted that the thermal imaging device 100 may be used with a subset of the calibrations described herein to estimate core body temperatures of living organisms other than humans and may be used with a subset of the calibrations described herein to obtain similarly highly accurate surface temperatures of objects other than living organisms. The device 100 may obtain overall body temperature measurements better than ±0.5° C., which is sufficient to detect fevers of 100.4° F. or more. Further, it may be advantageous for the subject to be tested to warm or cool to ambient temperature for a specified time (e.g., approx. 1 minute) prior to scanning. This time may vary depending on the temperature of the environment. As previously noted, the camera must have ample resolution to resolve specific regions of the subject (e.g., the inner eye region). As illustrated in FIGS. 8 and 9, an operator sets up the measurement area to ensure boundaries are well-defined. Upon a subject entering the FOV, the device 100 detects face and eye regions directly in the thermal image and a predetermined ROI shape is applied at each visible canthus location and the maxima or other summary statistic is taken as the canthi temperature estimate. In an alternative embodiment, face and eye regions are detected in a paired visible light image, where these regions transformed to the thermal image space before determination of canthi temperatures. A canthus quality measure may be determined by the canthus or eye detection system using the size of the determined canthus or a probability measure determined from the outputs of the detection system such as the valve derived from a softmax classifier. In one example, these canthi temperatures are converted to an estimate of the core body temperature using first a correction for the emissivity of the canthus and ambient temperature distribution via a gray body equation as well as for the reduction in transmittance of air given current ambient humidity and distance-to-subject (or transmittance ignored for certain ranges of ambient humidity and short distances typically used for fever detection). In a preferred embodiment, the surface temperature pixel measurement data is already corrected for the emissivity of the canthus via a predetermined first or second-order polynomial ambient temperature calibration. For similar emissivities and a reasonable range of background temperatures, the emissivity compensation for both the ETRS and the canthus together can be captured well by a close-to-linear fit for the desired temperature ranges.

A minimum number of measurements with sufficient canthus quality measures may be required, said minimum being a system parameter determined previously from population studies. If using two canthi ROIs, the difference over the standard deviation may be used to form a t-statistic and corresponding probability value denoting the statistical significance of a difference, which may be used to determine if the system was able to detect both canthi within a pre-specified probability threshold, and warn the user or otherwise collect additional data if needed.

The corrected canthi temperature is then converted to an estimate of the internal core body temperature using a physiologic or other model. Alternative correction models may be used, and one can create a plurality of correction models, each optimized to a specific scenario or target anatomical region or subject population stratified by age, gender, weight, or other factor determined by population study to better segment the physiologic correction model. However, in some examples, corrected canthi and ambient temperature may be converted into core body temperature using a low-order polynomial correction (typically linear, or first order polynomial over the 10 C to 35 C ambient temperature range) having coefficients derived by fitting data acquired with the system (corrected canthi and ambient) against reference core body temperature measurements acquired using a direct method such as a clinical oral thermometer probe such as the Welch-Allyn SureTemp Plus 960 (Skaneateles Falls, N.Y.).

For the purpose of temperature measurement in these regions, thermographic measurements may inadvertently be biased by occlusions, subject motion and incomplete pixel coverage. Accordingly, the device 100 described herein may determine the orientation of a face (e.g., facial pose) with respect to the image plane by fitting localized facial landmarks to a standard model or one of several models of a template face's landmark locations in space. The orientation within a roll-pitch-yaw (RPY) coordinate system may be used, although other orientations can be considered without loss of generality. Furthermore, an upright face facing the device 100 is considered the baseline orientation having zero roll, pitch and yaw. Here, roll is the rotation of the head about the axis perpendicular to the image plane, or the angle of tilt towards and away from the shoulders (imagine reading text in a document rotated by 90 degrees, most people will roll their head correspondingly), pitch is the angle about the axis passing from the left to right ears (imagine a "yes" head gesture), and yaw is the angle about the axis passing from the neck to the top of the head (imagine a "no" head gesture). The system under consideration will most often see very little roll, but some pitch and yaw. If pitch and yaw rotations produce a restriction of the visibility of the inner canthus on one side or both sides, it is beneficial to use this in determining the temperature and hence, a measure corresponding to potential restriction or occlusion of the canthus may be produced using a model of facial landmark positions to simulate the visible area under a given set of angles, which is then stored for each image frame as the maximum area divided by this simulated area, which is a floating point value between 0 and 1. In a preferred embodiment, the visibility of at least one canthus is used for determination of sufficient quality in each image, and in a sequence of images, a minimum number of frames with at least one canthus visible is used to determine sufficient data for a measurement.

Pixel sufficiency in the thermal domain refers to the need to subtend with sufficient number of pixels an object having or that can be reasonably assumed to have a singular temperature. If a pixel of a calibrated thermal sensor subtends an area having a singular temperature, then the pixel value can be guaranteed (notwithstanding caveats for thermography including accuracy, emissivity, etc.) to provide an accurate assessment of the subject temperature. If however, this pixel subtends two areas of different temperatures, then, assuming the difference in temperatures is within a few degrees, the pixel will approximately report the area-weighted sum of the two temperatures. Therefore, because the inner canthus in indoor conditions has a maximal value most closely approaching core body temperature, it is essential the canthus region is subtended by a sufficient array of pixels such that a maximum value in the array corresponds to the same maximum value across a set of repeated measurements made at shorter distances within the thermal imaging focus range. This is because the number of pixels subtending an area will increase as the imaging distance is decreased, and this can be used to determine sufficiency of pixel coverage in a pre-determined study as follows. For a set of representative subjects, the canthus maxima is recorded at a range of distances, with the shorter distances determining the limit of maxima for each subject, and the point of significant divergence as the distance at which the pixels no longer sufficiently cover the canthus. Using the limit of maxima and the detected face landmarks for each distance, the maximum distance across all faces can be determined and used to specify a maximum operating distance, which can be reduced by a reasonable safety threshold. Additionally, the distance between eye landmarks can be used to determine a minimum distance between landmarks where the maxima diverges from the limit. This pixel sufficiency may be used as a binary measure or it may be used as a floating point correction fraction in case it is desired to attempt to determine canthus temperatures beyond this limit, and this divergence may also be modelled with the study described here.

Further occlusions can be detected using a similar method as used for face detection. Specifically, images of subjects wearing eyeglasses or occluding one or both eyes with a hand or other object (i.e., simulated occluders), are used to train a machine learning model to discriminate between occluded and non-occluded images of eye regions. If the alignment and spatial pixel calibration between cameras is trustworthy, it is preferable to perform these methods in the visible modality, due to higher framerate and resolution, however these methods can be applied in either the visible image modality or the thermal image modality.

Subject motion can bias canthus measurements downward for similar reasons as described with respect to pixel insufficiency. Because of the relatively long exposure time, subject motion during the exposure time can result in a time- and area-weighted average of temperatures actually subtended by a pixel as said pixel appears to move across the subject's face during the exposure. Censoring motion and building in pixel sufficiency margins can reduce sensitivity to this artifact. These methods use frame-to-frame tracking and converting to percent pixel motion during the present thermal readout to produce a motion metric. For example, a 50% thermal pixel motion means the thermal pixel array shifted by half a pixel during the thermal exposure time window. Censoring requires a threshold that can be determined empirically based on the residual pixel sufficiency determined above. If the subject is sufficiently close (e.g. half as close as the distance where we expect to see a divergence due to insufficiency), the device 100 has double the pixels required and a 50% thermal pixel motion could be taken as the level where we would need to censor said frame due to motion. However, a full geometric consideration of pixel coverage and motion reveals a factor of the square root of 2 for worst case performance, and therefore, one would set a threshold of 70.7% of 50% or a 35% thermal pixel motion threshold. This implicitly introduces the second method, building in sufficient excess pixel coverage such that we can afford some amount of motion artifact.

In some examples, age and gender modelling may be used to select and apply age- and gender-specific canthus-to-core conversions and febrile thresholds.

In some examples, subject height and distance determinations may assist with processing. Subject height can be determined directly from the image data, if a suitable calibration procedure was performed. Distance to subject can be useful in determining pixel sufficiency and can be determined from facial landmarks or from observing standing location if the system is not moved over time and a suitable calibration procedure was performed. Height is a useful measure as a surrogate for age and can be compared with estimated age for selecting age-dependent corrections or thresholds. A one-time calibration of distance estimation from foot location with respect to ground features can be performed by having an operator stand at an identified ideal location where the subject may stand, in full view of the visible camera, while personnel holds a small plastic sheet having a structured pattern printed in black and white (e.g. an ARUCO marker) held in the imaging plane. This marker has a known, calibrated size and is provided with the system or can be printed without loss of calibration on standard printing machines. This marker is detected by a routine operating on the visible camera image frames, and the distance between the marker and the system is measured by standard measuring equipment and provided to the system on setup or on any change in the physical layout of the system. Furthermore, the marker is held at one location at the floor in the center of the desired monitoring location and again at 5 feet above the ground to the bottom edge of the marker sheet. These are used to determine the height and distance calibration constants, which are used with facial landmark locations and a correction factor for typical top-of-head location to determine subject height and distance from their facial landmarks.

In some examples, a shutter-free thermal imaging system may be used to provide accurate referenced measurements. Some systems rely on a temperature-compensated or known-temperature shutter-based offset correction to produce temperature readings. Each thermal pixel has a sensitivity to the radiant intensity of incoming thermal emission that can be described (over some specified range) by a low order polynomial on the imaging array temperature. Furthermore, each pixel has an electrical offset and also sees a combination of internal thermal emission and the desired object thermal emission, which can be described by a low order polynomial dependent on the imaging array and internal optics temperature. To subtract all except the object thermal emission and furthermore convert its radiant intensity to object temperature, there are a number of calibration strategies, one involving many acquisitions sufficient to model the internal thermal emission as well as the sensitivities and electrical offsets, and one involving fewer acquisitions plus an electrically-operated shutter element to reduce the problem to determining the sensitivities of each pixel. The shutter component is intended to correct the offset resulting from the internal thermal emission generated by the optical pathway and sensor itself, while the sensitivity of each pixel is corrected by a separate set of parameters obtained by first applying an offset subtraction (provided by the shutter) and then imaging a plurality of target calibration temperatures while the camera itself is moved through a plurality of operating temperatures, with appropriate thermal equilibration between measurements. In an ideal scenario having little change in the internal thermal emission, applying an offset correction using an ETRS could suffice to remove the offset normally corrected by the shutter, and if this is true, a shuttered thermal camera plus an ETRS should experience no drift. However, at least some calibration routines in common use today unavoidably mix the offset and sensitivity such that the resulting image is incompletely corrected by the use of an ETRS. This is normally not an issue, because a shutter is used to do that offset correction, and thus, all is well. However, this ignores the drift between shutter operations. The temperature reported by a shuttered thermal camera calibrated to ±2° C. accuracy can drift as much as 4° C. between shutter operations, and while this is mostly due to offset, there is a component due to change in sensitivity, and as such, the ETRS correction will be incomplete for shuttered cameras. This drift is different for different imaging sensor arrays, which can have considerable variation.

In some examples, humidity, ambient temperature, and airflow may be monitored and compared with ISO guidelines for human body temperature measurement. Because thermographic evaluations of canthus regions may be affected by ambient absolute humidity, temperature and airflow, in order for a fever detection system to be trustworthy, it is not reasonable to expect users to continually monitor these conditions. Accordingly, the system 100 may additionally include ambient air humidity and temperature sensors such that these sensors accurately obtain the same environmental conditions, within a few percent, of those experienced by the subject. This is ensured by first performing thermal modelling of the power deposition in heating the unit housing and producing heated airflow by the normal operation of the system (without the humidity and temperature sensors) and by adding the sensors to a location unaffected by the heated airflow or housing. Airflow is assessed once at installation and the system monitors for changes in the airflow by having a second temperature sensor mounted at a location near the thermal camera having a known and constant power deposition, whether by an integral component of the system or an added component selected solely for uniform power deposition and this purpose. Change in airflow can be detected by, upon a short delay on cold-start to allow thermal equilibration at this air conductance measuring sensor location, monitoring this second thermal sensor for reductions due to increased air conductance. The expected temperature is also dependent on ambient air temperature, which is obtained from the first isolated ambient air temperature sensor. In this way, a significant increase in airflow can be noted automatically. Alternatively, the reduction in temperature of this second sensor may be calibrated to reduction in canthus temperature and used in a second-order physiologic correction incorporating this second thermal sensor's output and the first ambient thermal sensor's output to enable the canthus-to-core conversion to remain accurate in the presence of air flow.

In some examples, the system 100 may include cough detection and discrimination from sneezing features. During the fever detection image acquisition, the system 100 can be directed to monitor for cough sounds via real-time conversion of audio data to Mel-frequency cepstral coefficients (MFCC) and an acoustic deep learning model trained to identify coughs. A cough time series measure is produced from the start of the scan through to the conclusion of the scan. This is unlikely to produce a clinical relevant measure without additional prompting, thus the subject is directed to inhale deeply and the inhalation depth is monitored. The sequence of detected faces can be passed to a visual cough detection model and the outputs of this can be compared with the output of the audio cough model to confirm or disconfirm cough in the currently monitored subject.

In some examples, the results may be presented in a form that can easily be carried with the subject. In contrast to existing systems for fever detection, the system 100 produces a report of fever status for each subject as a small sticker to be worn by the subject immediately after conclusion of the scan. This sticker provides a visible indication of fever status, a timestamp and an ID unique to the subject and potentially other encoded information. In some examples, the report may be in the form of a printed card to be kept in the subject's possession or hangtag to be worn by the subject. Alternatively, the system 100 may select from a variety of stocked cards or wristbands indicating status by color or shape or printed information of the object. In some examples three unique status types may be used to represent good, borderline fever, and fever (or green, yellow and red) determinations. Such a system may be implemented in existing physical ticketing systems (e.g., airline, bus, train or other transportation or sporting, concert or other crowd entertainment controlled entry schema systems) by causing the system to print a coded status of the subject (ticket holder) onto the ticket or electronically into holder's e-ticket or simply use a hand stamp or other system such as those used for verifying one is above or below the legal age for alcohol consumption.

The report medium generated by the system could carry a timestamp, or alternatively, an ink designed to change color within a specified time (e.g., 24 hours) that indicates sufficient time has passed such that the test is no longer valid.

In some examples, the system 100 may include approaches for automatically detecting user compliance with results. It is possible a subject may attempt to evade compliance and substitute another's report with their own. Accordingly, the dispensing process may include structures to inhibit such activity. Furthermore, it is possible to use identity embeddings or other more traditional computer vision techniques to identify a subject from scan to report dispensing. In these examples, for each subject, the system 100 may acquire a face crop and set of feature embeddings from a model trained to produce vectors uniquely-separable in L2 distance for unique individual faces. The main camera is used to track this subject until they have moved to a dispensing unit and confirm their face produces an embedding vector within some margin of their original vector, or alternatively if the face detected at that time has a greater distance, a notification is raised that a person is retrieving potentially inapplicable report results. These face embeddings vectors are useful for other purposes, such as ensuring that a subject being scanned was not already recently scanned.

In some examples, the system 100 may estimate whether the subject may have been at a significantly cooler or warmer air temperature. Most indoor spaces have controlled air temperature within a fairly narrow range around 20° C. (68° F.). Subjects moving from a much colder or much warmer environment to a typical "room temperature" indoor environment have canthi that do not reach thermal equilibrium until some time has passed. The system 100 may reliably determine whether a subject was still equilibrating to the indoor environment. Specifically, the distributions of a subject's upper body clothing and face temperatures could be compared to a database of the same acquired when it was known the subject had recently been at a plurality of colder (and warmer) ambient air temperatures within one minute of the scan, and a reliable determination based on the means and standard deviations of the chest or face pixel values in each condition and the present condition. In an example, the temperatures of a secondary facial area such as the forehead may be compared with the canthus and possible recent hot or cold exposure may be discriminated using a physiologic correction obtained for the secondary face area, with the difference between the resulting extrapolated core temperatures being used to determine the face may still be thermally equilibrating. The determination of need for equilibration can be converted into a time needed to wait within the indoor air environment before a repeat scan may be performed, which can then be presented to the subject in lieu of a completed report. The system can also acquire current local weather conditions and compare with current internal air temperature measurement. The delta between current internal weather and current outdoor weather can be used to heighten sensitivity to this measure or to stop use altogether.

In some examples, the system 100 may be integrated with other systems accessible to the user. The results of the fever detection system 100 may be used to control access or triage subjects for further evaluation. For such users, it may be beneficial to integrate such system with an existing system used to control access or otherwise monitor subjects. This could include employees of a healthcare facility or any other company concerned with preventing the spread of communicable infectious disease. It could also be oriented towards services restricted to physical or electronic ticket-holders, such as airline passengers or concert attendees. Finally, it could also be oriented towards any other structured access area such as a governmental services building or military compound. The methods and equipment required for integration depend on the systems used to monitor or control access. For example, such fever detection system could be integrated with the employee clock-in system, employee keycard RFID or card swipe access or identity card system to limit allowing access or beginning a shift or otherwise providing compliance verification. In a further example, the system 100 may be integrated with airline, bus, or train ticketing system by providing a date-stamp and result directly to a printed ticket, or to be caused to add a tag to an electronic ticket. In a further example, the system 100 may be integrated with a patient appointment, hospital intake, or direction-providing system in a HIPAA-compliant manner, such as by confirmation of user's identity comparable to that required by patient-facing medical portal or by QR code produced by patient's personal electronic device under the patient-facing medical portal application. In a further example, the system 100 may be used to simply apply a coded stamp to the subject's hand similar to systems commonly used to verify a subject is above or below the legal age for alcohol consumption or systems used to prevent voter fraud by one person entering multiple ballots.

In some examples, the system 100 may provide a hands-free presentation and interaction with subject. As previously noted, the system 100 may include the display 115 and/or audio prompts and/or structured light to guide the subject such that a proper measurement can be obtained, and to guide the subject in obtaining and using report results. Prompts generated by the system via display or audio for the subject to perform some specific gesture can be collected automatically by gesture recognition. The display 115 may show instructions, followed by or in parallel with a view of the subject or a rendered avatar of the subject within the subject's environment or simulacra of the subject's environment, providing guidance to assist the subject in complying with the conditions necessary to obtain a meaningful canthi measurement. For example, the subject may be aiming their head too low (pitch), and the display can direct the subject to raise their head by showing an arrow with the subject's head or the head of an avatar intended to represent said subject. Or the subject may be directed to remove their eyeglasses, with the screen changing color or intensity upon completion of the scan (said impending change in display as well as time limit being communicated to subject before directing the subject to remove eyeglasses), indicating the subject may replace their eyeglasses again.

If the system 100 determines the subject has recently been seen by the system 100 and is configured to reject faces determined to be below some similarity threshold, it may display a prompt requesting the subject to either contact a user personnel or to perform additional gestures indicating they have not been scanned yet or indicating they have been scanned but wish to be re-scanned. If a subject wishes to be re-scanned, the system 100 may require presentation of their previous report results by holding them in view in front of the camera. A report may be generated upon conclusion of this repeat scan that references the first or plurality of previous scans and includes some visible notation indicating the highest severity fever previously determined.

In addition or alternatively, the indicator lights 118 can be directed onto the ground or wall facing the scanning area or onto the subject to assist subject compliance in positioning as well as indicating the sequence of steps in scan process. For example, the system 100 may project light indicating a box on the ground for where to stand with an arrow pointing from the box to the system 100. The system 100 may also project text indicating what the subject should do, e.g. remove eyeglasses and adjust the projection once the scan is complete to project an arrow pointing to an area to collect their report when complete. In some examples, the system 100 may provide a prompt for the subject to indicate various conditions, e.g. cross hands over chest if your response is "no", uncross hands and keep raised if your response is "yes". Questions of interest may include "Have you taken any of: any medications or any supplements or any over-the-counter medications?" or "Have you had a fever in the last week?" or other questions provided by the user in the system configuration.

In some examples, the system 100 may include HIPAA-compliant data collection approaches to enable IRB-approved research to improve understanding of the relation between measured subject temperatures and health. Because the collection of potentially-identifiable information, such as face images, is regulated under the Health Insurance Portability and Accountability Act (HIPAA), informed consent acquired under an Institutional Review Board (IRB) approved protocol and consent is required. Human subjects enrolled in a clinical trial utilizing information collected by the system described are asked to undergo body temperature measurements, at least once with a clinical oral probe thermometer in high accuracy mode, and at least once with the system described, which may take place in any order but the measurements must be started and completed within a short time period (e.g. 5 minutes). The system 100 is configured to present a non-identifying unique number upon completion of the diagnostic and may also present its estimate of core body temperature. The clinician operating the measurements will record the oral temperature and at least the unique number corresponding to the measurement data recorded on the device, in a secure electronic database or secure paper recording system or the subject's medical record. Each subject's device dataset includes at least one set of thermal face image data acquisitions and calibration parameters and may include visible light face acquisitions. Because linkage to personally identifiable information is protected by HIPAA, the image data collected by the fever scanner is stored in a form that is not decipherable without a private key that is not located on the device. The measurement data is stored in volatile system memory, compressed and encrypted with the public key of a public-private key pair, and only the encrypted dataset is stored or transferred securely over an encrypted communication channel to a secure server. The private encryption key is retained in a private key held only on a password-protected and secure computing system separate from the fever detection system described above and not accessed until the completion of the clinical trial or as required for data safety and integrity monitoring. Only data corresponding to enrollees may be transferred by reference to their unique measurement number. Such a process ensures that any data contained on the device, cannot be decrypted and viewed without the private encryption key, which resides on a server accessible only by authorized investigators on the research team.

The system 100 described herein provides for accurate and consistent temperature detection. Nonetheless, additional approaches for ensuring accuracy are now described. Generally speaking, the data correction system 170, which is communicatively coupled with the thermal imaging system 110 and the reference illumination system 130, is adapted to correct at least one error associated with the captured thermal image or images. The data correction system 170 may employ both hardware and/or software elements to ensure the accuracy of the captured thermal image and the data associated therewith.

In some examples, the data correction system 170 may correct for nonuniformity errors. More specifically, in examples where two reference calibration units 140 are used, each reference calibration unit 140 may be set at different temperatures (e.g. 32.00° C. and 37.00° C.). Using different temperature set points allows the data correction system 170 to linearize the sensed signal level into an accurate surface temperature. In examples where a single reference calibration unit 140 is used, the thermal imaging system 110 must be calibrated to produce a linear (proportional to object temperature) output, whereas in systems 100 employing two or more reference calibration units 140, the output can be linearized. As a result, the system 100 avoids a need for substantial calibration to the thermal image sensor 122, which would otherwise increase system costs. The data correction system 170 uses a shutter element 172 along with a single gain calibration to accurately linearize temperatures to obtain as low as approximately 0.1° C. surface temperature accuracy.

Each thermal pixel has a sensitivity to the radiant intensity of incoming thermal emission that can be described (over a specified range) by a low order polynomial plus an electrical offset. Further, each thermal pixel also sees a combination of internal thermal emission and the thermal emission of the subject. There are various calibration approaches used to subtract all except for the thermal emission of the subject and to convert its radiant intensity to an object temperature. One such approach may involve several acquisitions sufficient to model the thermal emission of the subject in addition to the sensitivities and electrical offset values, and another example approach may involve obtaining fewer acquisitions but with the shutter element 172, which may be electrically-operated, to reduce the problem to determining the sensitivities of each pixel. In the first approach, an offset and a gain image is generated or updated based on the microbolometer sensor temperature, and this offset image is subtracted from the raw voltage image offset, and the resulting offset-corrected image is then divided by the gain image, resulting in a gain and offset-corrected image, said offset and gain images being generated from coefficients derived from a shutter-free calibration process. In the second approach, an electronically-controlled shutter is used to obtain an offset image, which is generally calculated by accumulating and averaging multiple frames while a shutter surface is occluding the thermal field of view. This shutter offset image is then subtracted from subsequent acquired raw voltage images. Gain calibration for both approaches is determined in the following way. First, the thermal image sensor 122 is exposed to two different radiant intensities, and the gain (sensitivity, or millivolts per C) is determined for each pixel by subtracting the lower radiant intensity image from the higher radiant intensity image and the result scaled by the difference between the known temperatures of the radiant intensity sources. This gain can change with microbolometer sensor temperature so the sensor temperature must be manipulated so a series of gains can be acquired at different sensor temperatures covering sufficient operating temperature and a set of gain correction coefficient maps generated (generally a 2nd order polynomial, or three coefficients per pixel). These same or additional radiant intensity exposures can be used to determine image offset coefficients by fitting the pixel voltage and a low-order polynomial (generally a 3rd order, or four coefficients per pixel) for offset dependent on sensor temperature to the radiant intensity target times the gain using the now-determined gain coefficients with the sensor temperature. If the resulting offset and gain-corrected image does not match radiant intensity exposures sufficiently, further radiant intensity exposures can be used to convert these first-order offset- and gain-corrected voltages into object temperatures, or alternatively, the ETRS radiant intensity observed in these offset- and gain-corrected images can be used to convert the corrected images into object temperatures. It is appreciated that more complex offset corrections may be used by the data correction system. However, in these examples, many of the offset components typically associated with more complex offset corrections are not needed in the data correction system 170.

The data correction system 170 uses the shutter component 172 to correct the offset resulting from the internal thermal emission generated by the optical pathway and the thermal image sensor 122, while the sensitivity of each pixel is corrected by a separate set of parameters obtained by first applying an offset subtraction (provided by the shutter 172) and subsequently imaging a plurality of target calibration temperatures while the camera thermal imaging system 110 is moved through a plurality of operating temperatures via the reference calibration units 140. The data correction system 170 uses appropriate thermal equilibration between measurements. In some environments where the internal thermal emission remains at or near constant, the data correction system 170 may simply apply an offset correction using the reference calibration unit or units 140 to remove the offset normally corrected by the shutter 172. In these examples, a shuttered thermal camera along with a reference calibration unit 140 would experience little to no thermal drift. However, because this calibration routine unavoidably mixes the offset and sensitivity, the reference calibration unit 140 may provide an incorrect correction to the resulting image if the shutter temperature is not sufficiently controlled, which will cause a residual gain-dependent offset that varies across the image. For a system with insufficiently controlled shutter temperature, to minimize the residual effect of shutter temperature, an offset determined via the shutter-free process described above can be subtracted before gain uniformization for all images, including the shutter images so each shutter image contains primarily this residual offset, and in this way the subsequent shutter subtraction removes residual offset. The temperature reported by a shuttered thermal camera calibrated to ±2° C. accuracy can drift as much as 4° C. between shutter operations, and while this is mostly due to offset, there can be a component due to change in sensitivity, and as such, the reference calibration unit 140 correction will be incomplete for shuttered cameras. Accordingly, by using two reference calibration units 140, the data correction system 170 may account for residual nonlinearity in the calibration of the thermal image sensor 122 to avoid inaccuracies due to substantial sensitivity drift between shutter events. In examples where the two reference calibration units 140 are in continual view by the thermal image sensor 122, the data correction system 170 may use a shutter-based nonuniformity correction, a non-shuttered gain uniformization and offset reduction system across all pixels, and a temperature conversion relation. Such a data correction system 170 substantially reduces calibration costs.

The temperature, emissivity, and distances of the reference calibration units 140 are fixed. The reference calibration units 140 themselves have a calibrated radiant intensity value. The data correction system 170 uses a single point shutter element 172 to complete the non-uniformity correction. The shutter element 172 has a moderately high emissivity shutter surface (e.g., having an emissivity greater than approximately 0.9) and is at similar temperature to the thermal image sensor 122 or housing 102. In some examples, the shutter element 172 is thermalized to the front of the optics pathway between the shutter and the sensor. In some examples, the shutter element 172 may be placed behind the lens positioned near the thermal image sensor 122, in which case, the lens and the geometry of its thermal emissions are designed accordingly. For example, the housing and shutter fixture may be designed to provide a thermally conductive pathway between the shutter surface and the optics, and ideally the entire microbolometer sensor assembly, such as with an Aluminum enclosure thermally mated to the optics and surrounding as much of the shutter surface as possible without occluding the imaging field of view. Further gains are possible by enclosing the entire shutter in a hermetically sealed enclosure having a window made of a thermally-transparent material, such as Germanium. More specific design considerations may be arrived at using lumped element circuit modeling and the thermal parameters of the materials that can be used in the construction. In an example, two thermal time constants can be compared, one for a 1 C transient generated at a Germanium window to cause a transient at the shutter or the front of the imaging optics and the second for a 1 C transient generated at this second location to cause a transient at the microbolometer sensor array, and an example design rule could be to ensure the time constant for the window to shutter or optics is at least 5 times the time constant for the shutter or optics to sensor array pathway.

In some examples, a single set of coefficients (e.g. two or three coefficients—the temperature to radiant intensity relation is close to linear at typical ambient temperatures) is fitted to the data and is maintained for the complete thermal imaging system 110. In subsequent uses of the system 100, the data correction system 170 uses the voltage values of the relevant measurement pixels (e.g. of a subject's inner eye regions) and first applies offset corrections and subsequently applies gain corrections as the measurement intermediate result. The two reference calibration unit 140 offset- and gain-corrected values are used with the single temperature conversion equation and two-point adjusted with the known temperatures of the reference calibration units 140. Next, the measurement intermediate result is interpolated to the conversion equation with the two-point adjustment provided by the reference calibration units 140 to arrive at an accurate measurement result. It is appreciated that some steps may be combined or separated as needed for other purposes or for other corrections.

Figure 27:
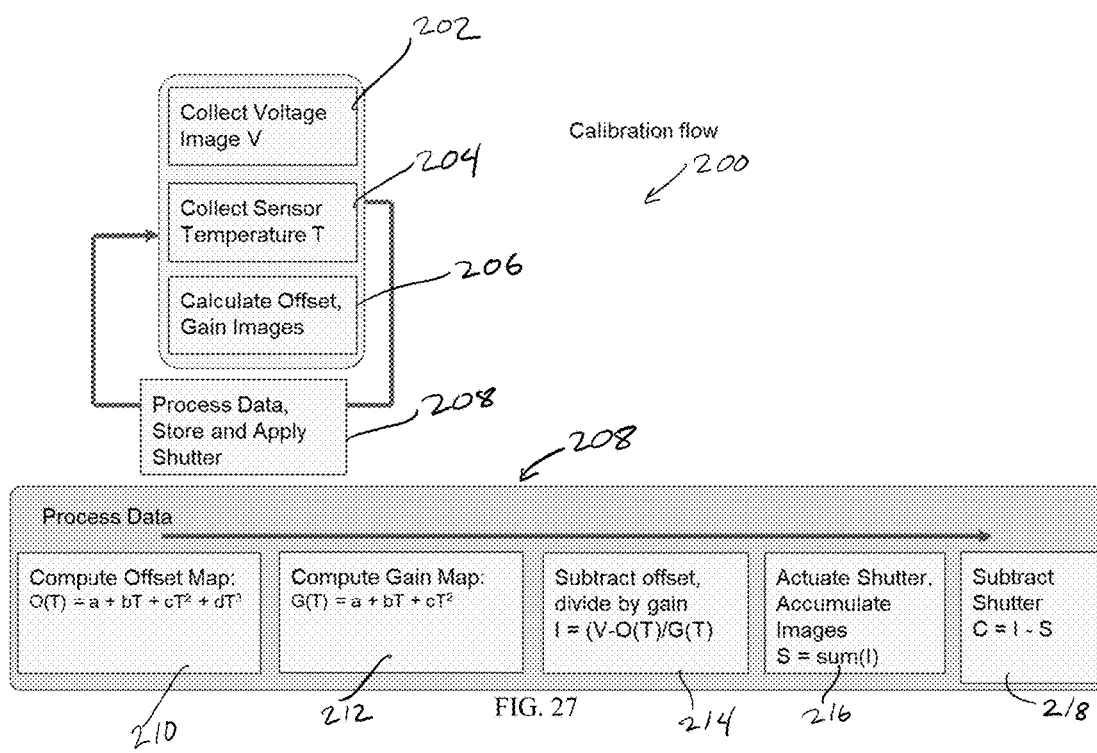
FIG. 27 illustrates an example approach for a linearization calibration of the thermal imaging device of FIGS. 1-26 in accordance with various embodiments.

Turning to FIGS. 27-30, flow charts are provided. In FIG. 27, a linearization (gain and offset) calibration flow chart 200 is illustrated. First, at a step 202, a voltage image V is collected. At a step 204, a sensor temperature T is obtained. At a step 206, an offset image and a gain image is calculated, and at a step 208 the data is processed and stored. Periodically at step 216, a shutter is applied in order to calculate an average shutter image. More specifically, the data processing step 208 includes computing an offset map at step 210, computing a gain map at step 212, subtracting the offset and dividing by the gain at step 214, periodically actuating the shutter for a period of time and accumulating a small set of shutter images (e.g., 25 images) at step 216, releasing the shutter and calculating an averaged shutter image, and subtracting the averaged shutter image from subsequent offset- and gain-corrected images at step 218. The shutter operation is applied according to the experimentally determined rate of change in the residual background offset, e.g., every five minutes or every 0.5° C. change in silicon die temperature.

Figure 28:
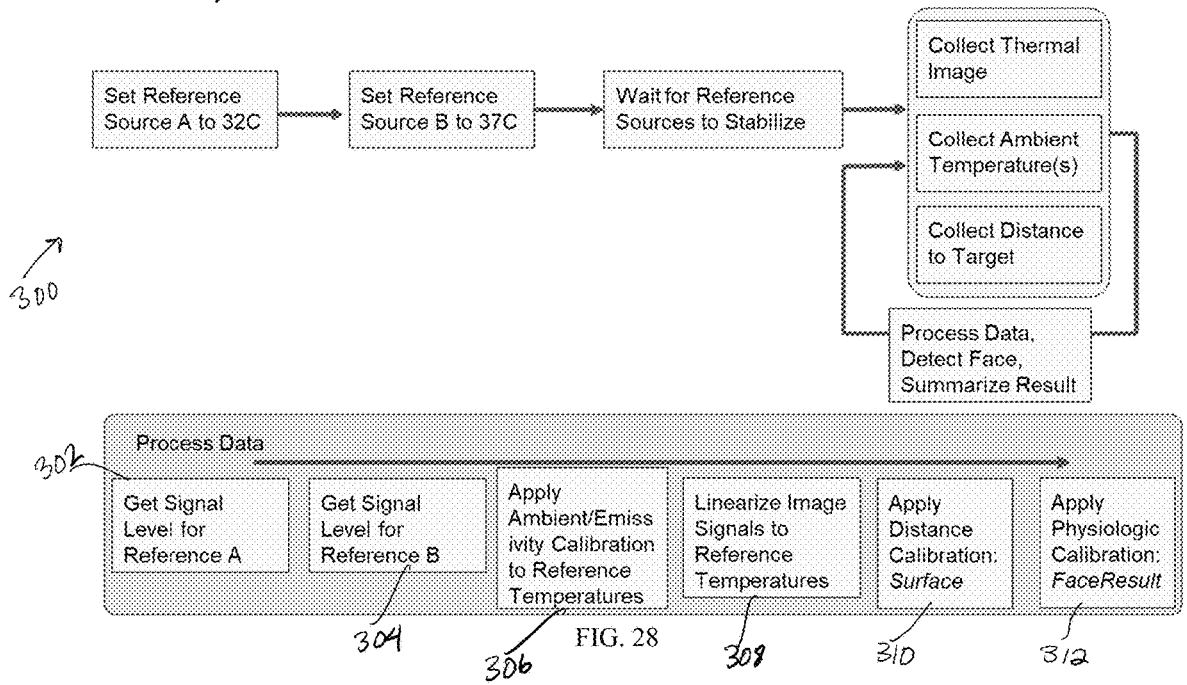
FIG. 28 illustrates an example approach for the processing of data using the thermal imaging device of FIGS. 1-27 in accordance with various embodiments.

As illustrated in FIG. 28, a process 300 for the processing of data is provided. As an initial matter, in this example, the user first sets the reference calibration units 140 to 32° C. and 37° C. respectively, then waits for the reference sources to stabilize, whereupon the user collects a thermal image, an ambient temperature value, a distance to target value, then begins the step of processing the data 300. At a step 302, the process 300 obtains a signal level for the first reference temperature value, and at a step 304, the process 300 obtains a signal level for the second reference temperature value. At a step 306, the process 300 applies an ambient/emissivity calibration to the reference temperature values. At a step 308, the process 300 linearizes image signals to the reference temperatures. At a step 310, the process 300 applies a surface-based distance calibration, and at a step 312, the process 300 applies a physiologic calibration.

Figures 29, 30:
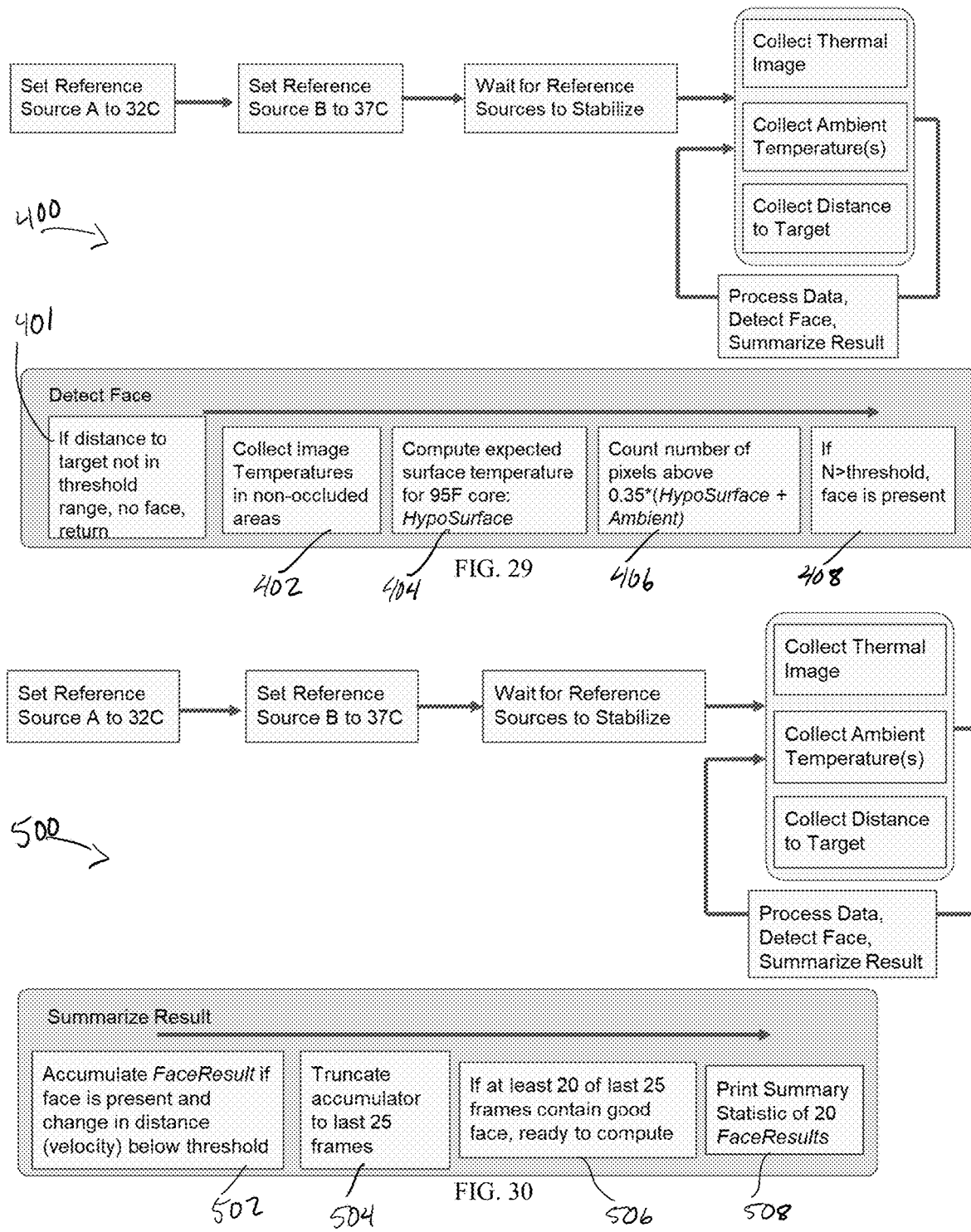
FIG. 29 illustrates an example approach for the correction of face detection data using the thermal imaging device of FIGS. 1-28 in accordance with various embodiments.
FIG. 30 illustrates an example approach for summarizing results using the thermal imaging device of FIGS. 1-29 in accordance with various embodiments.

As illustrated in FIG. 29, a process 400 for face detection is provided. It is appreciated that the same initial steps as previously described with respect to FIG. 28 occur prior to the face detection process 400. As described in box 401, if the distance to the target does not fall within a threshold range, the process 400 determines no face is present, and the system returns to collecting ambient temperatures. At a step 402, image temperatures are collected in non-occluded areas. At a step 404, an expected surface temperature for a 95° F. core is computed in order to set a lowest expected surface temperature threshold for a non-hypothermic individual. At a step 406, the process 400 counts the number of pixels above 0.35% of the difference between the expected lowest surface temperature and the ambient temperature, e.g., assuming a lowest expected human surface temperature of 90.2° F. and an ambient temperature of 70° F., 35% of this difference is 7.1° F., thus a threshold of 77.1° F. is used. At a step 408, if this number is greater than a threshold value, the process 400 determines a face is present.

As illustrated in FIG. 30, a process 500 for summarizing results is provided. It is appreciated that the same initial steps as previously described with respect to FIG. 28 occur prior to the result summary process 400. At a step 502, the process 500 accumulates a result if the process 400 determines a face is present and a change in distance is below a threshold value. At a step 504, the process 500 truncates an accumulator to the last 25 frames. At a step 506, if at least 20 of the last 25 frames contain a "good" face, the process is deemed ready to computer, and at a step 506, a summary statistic of 20 face result values is printed.

In some examples, it may be possible to avoid performing the entire calibration process at the time of final assembly and validation of the system 100. More specifically, the calibration may be performed in the field, at the time it is needed, by relying on the accuracy and availability of two reference calibration units 140 set to temperatures bounding the desired measurement range. The thermal imaging system must either use special optical coatings or it must use a pixel radiant intensity dependence correction to minimize the effect of stray radiant intensity unintentionally being focused onto adjacent pixels. These reference calibration units 140 must cover those portions of the field of view that will subsequently contain measurement pixels (e.g. of the inner eye regions). The reference calibration units 140 are sequentially exposed to the thermal image sensor 122 for at least one acquisition frame act as temperature-controlled shutters. It is appreciated that multiple frames can be averaged to reduce error. The lower and higher temperature shutter images can be applied directly to the measurement pixel values, using the known temperatures of the reference calibration units 140 to interpolate and fit to the measurement result in a two-point correction. Further, in some examples, a third, uncontrolled reference calibration unit 140 may be used if it is maintained in view of the thermal image sensor at times when the two controlled reference calibration units 140 are not operated and/or are in a standby state. This third reference calibration unit 140 may be mounted a distance from the thermal image sensor 122 or alternatively, it may be adjacent to the reference calibration unit shutters such that it occludes a small portion of the field of view of the thermal image sensor 122.

Radiant intensity is typically considered to be independent of the distance to target, assuming the radiance of interest is fully subtended by a pixel and all radiant intensity is focused on said pixel. However, in practice there can be a small dependence on distance to target of around a percent or a few hundred milliKelvins. This effect has also been reported in visible light luminous intensity imaging measurements, the source of which is unclear at present. More specifically, for a given focus, an IR calibration target placed at a first distance from the thermal image sensor 122 may be reported as having a higher temperature than the same target scanned at a further distance from the thermal image sensor 122, independently of any regional pixels-dependent effect. The data correction system 170 described herein may calibrate this difference by using a laser-based time-of-flight sensor 124 or other distance ranging sensor (e.g., a distance ranging sensor or rangefinder) to determine the distance to the subject. The data correction system 170 may use a precalibrated low-order polynomial (e.g., a first order polynomial, a second order polynomial, a third order polynomial, etc.).

In an example, the time-of-flight sensor 124 may be mounted or otherwise operably coupled with the reference illumination system 130. The field of view of the time-of-flight sensor 124 may be reduced by ignoring outer pixels to fall below that of the thermal imaging sensor 122, and it may be used to obtain distances to targets positioned in the center of the array. In other examples, an average or minimum distance within the selected field of view or a location or locations within the field of view is selected by comparing to image processing performed on the accompanying thermal image sensor. The data correction system 170 uses the calculated distance along with a previously-determined effective temperature correction that includes a second- or third-order polynomial or other suitably representative model over the acceptable range. The resulting corrected temperature is then taken as the distance-independent effective temperature.

The measurement of radiant intensity can be distorted by unfocused or stray thermal radiant intensity. For thermal imaging systems that have been calibrated with full-FOV exposures, which is the usual method, being used to obtain temperatures of areas that differ from the local adjacent pixel temperatures, the effect appears as a regression of the object temperature towards the local adjacent pixel temperatures when the radiant intensity fills less than some portion of the field of view. For example, when viewing human faces expected to be around 34 C with a background of 20 C, if the face is partially occluded by a mask, glasses, a hat, or simply contains enough colder face regions due to recent cold air exposure, the effect is an underestimate of the canthus temperature. This effect may be caused by stray radiant intensity arising from internal reflections, as it has been observed that certain surface coatings can reduce the effect. Thus, to minimize this effect, the thermal imaging system must either use special optical coatings or the calibrated image must be corrected with a local radiant intensity dependence relation. Optical coatings meeting the required specifications can be obtained, but require additional cost and lead time and can incur additional limitations. For optics exhibiting the effect, a correction has been developed based on the observed effect. The effect is dependent on the specific optics, coatings and the sensor's inherent wavelength sensitivity and must be calibrated once per system design and may subsequently be used for all systems sharing the same optics and sensor. For simplicity, we describe a fixed object temperature range calibration.

Figure 31:
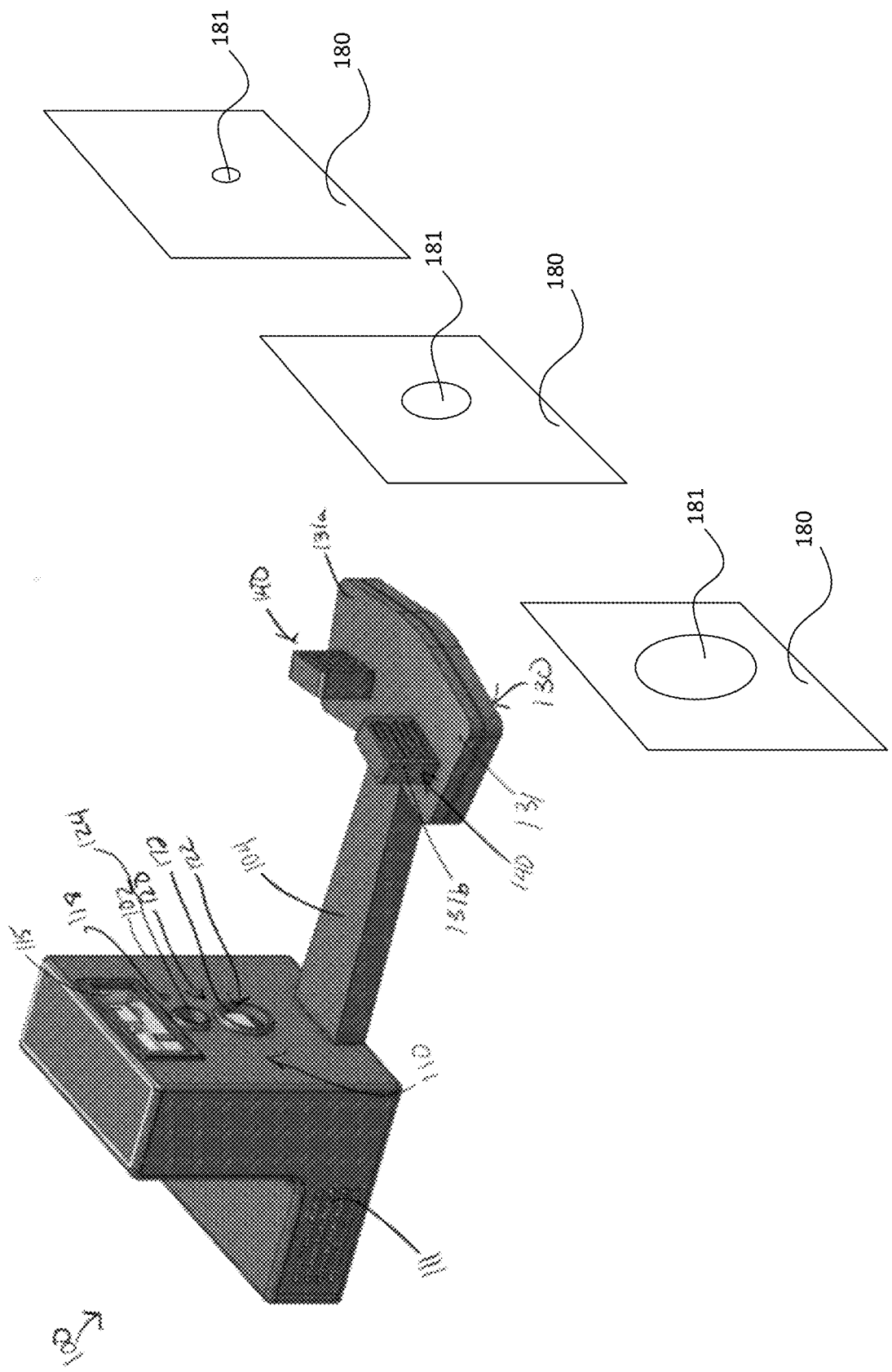
FIG. 31 illustrates an example calibration process for the thermal imaging device of FIGS. 1-30 using occluding targets having different sized holes in accordance with various embodiments.

FIG. 31 illustrates an example calibration process. The calibration acquisition is performed using occluding targets 180 having at least three different sized holes 181 placed in front of a controlled temperature IR calibration target, where the range of occluding sizes is varied from a maximum size, or portion of the total field of view above which no further effect is seen, to a minimum size, where diffractive effects begin to dominate. An unoccluded acquisition should be taken as near in time and ambient conditions to the occluded acquisitions. The IR calibration target is set to at least two different temperatures near the target temperatures and the acquisitions repeated. In practice, a number of acquisitions are acquired in each case, being averaged to reduce the impact of noise. The effect at the center of each acquisition hole 181 can be determined by subtracting the unoccluded acquisition average image from each occluded acquisition average image. This image data can be converted to a presumed ground truth dataset by assuming the true temperature does not vary with local pixel intensity and thus the occluding mask temperature is used in place of all pixels less than a third the difference between the hole and mask while the unoccluded temperature is used in place of all pixels greater than two thirds the difference between the hole 181 and the mask, with a zone in between these regions being dilated with a 3×3 kernel and removed from subsequent analysis. The effect was found to have a linear dependence on the difference in temperature between the unoccluded IR calibration target and the occluding target 180 temperature and an inverse relationship to the square root of the hole area, or an inverse pixel distance dependence. The integral over pixel radius of the difference in temperature divided by the square of the pixel distance from zero to infinity for a hole starting at R is proportional to the observed temperature difference over pixel distance. A convolution kernel with inverse radius weights was generated for various sizes and normalized and applied to the data, with the original image subtracted from the result. The amplitude of the effect size is determined by fitting to the difference between the acquired and ground truth calibration data.

The data correction system 170 receives offset-, gain- and residual shutter-corrected images and applies the local pixel radiant intensity dependence correction by applying a normalized inverse radial convolution kernel, which then has the calibrated image subtracted from it, and a fixed amplitude times this image is added back to the original calibrated image to produce an image with minimized local pixel radiant intensity.

The data correction system 170 may also account for variations due to air conductance. If the air temperature is below core body temperature, a subject's face will be cooler than the core body temperature due to the effect of the external environment and skin insulation on the body temperature of the subject. The hottest area on a face, where said face has been exposed to the current ambient air temperature for at least some minimum equilibration time, is the area with the least insulating tissue between freely perfusing blood at core body temperature and the ambient air. In most cases, the hottest area is the inner canthi, although other areas directly above arteries can be similarly hot or slightly hotter, depending on constantly varying vasomotion that produces less effect on the inner canthi. To determine a core body temperature from an accurately measured surface temperature on the face of the subject, the data correction system 170 corrects for the effect of temperature decline through the top layers of skin with a physiologic correction. The physiologic correction is dependent on ambient temperature, ambient reflected thermal emissions (due to its effect on total power transmitted through the skin), and the current ambient heat transport coefficient to air. The correction coefficients may be determined from suitable data including surface temperature and oral or other core body temperature measurements obtained in volunteer subjects who are exposed to different ambient temperatures. Generally, the data correction system 170 may use a physiologic correction, or a linear fit of the difference between surface temperatures and core temperatures to the ambient temperatures seen for those measurements. However, ambient temperature measurements may not provide adequate data for the corrections, as total heat conduction may impact captured data. Total heat conduction is at a minimum when the air is still and conditions are perfect. Slight air movement, humidity, and radiative heat are difficult to separate when using a simple proportional-to-ambient temperature sensor.

Accordingly, the data correction system 170 may use a heated and/or cooled probe 174 having an accurate temperature sensor along with a nearby unheated probe 176 that is sufficiently distanced and oriented to avoid influences from the heated and/or cooled probe 174. The probes 174, 176 measure air conductance to determine the totality of the air conditions that could affect the skin temperature of the subject. By measuring this factor in parallel with core temperatures and surface temperatures prior to generating a physiologic correction, the resulting correction is more accurate. More specifically, the heat (Q, in Watts) produced electrically inside the heated and/or cooled probe 174 is controlled, and the materials and configurations of the probe are chosen to optimize the measurement of the total heat transport coefficient to local air. The temperature decline ($\Delta T$) divided by the power is equal to the total thermal resistance (R), which is inverse to the exposed heated surface area (A) times the three components in parallel of radiation and conductance plus convection. The radiation component can either be determined from thermal physics and eliminated or minimized further by using a low emissivity surface surrounding the heated and/or cooled probe 174. So configured, the heated and/or cooled probe 174 and the unheated probe 176 are used to provide an effective conductance plus convection coefficient ($W*m^2/K$). Alternatively, the probe may be used to provide a simpler metric corresponding to the reduction in air temperature, which can then be used in subsequent correction methods. Given the approximately linear relation between core temperature and skin temperature, the slope coefficient of the original physiologic correction can be modified to have a low-order polynomial dependence on the output of the heated and/or cooled probe 174. Over a defined operating range of temperatures, the data correction system 170 may use a linear model that is fitted between the $\Delta T$, the ambient temperature and thus-far-corrected measured skin temperatures to clinical measured core body temperatures to result in a more complex correction to core temperature, but a correction that is ultimately less sensitive to the variety of ambient conditions likely to be experienced.

In some examples, the data correction system 170 may correct for the effects of ambient temperature on surface temperature measurement using an unheated ambient air temperature probe measuring the local air temperature. These effects include small offsets in the reference illuminator temperature and larger offsets arising from the emissivities of the target and reference illuminators with ambient temperature. The data correction system 170 may use a low-order polynomial accepting at least one measurement obtained from the air temperature probe to calculate an ambient temperature dependence of the surface temperature measurement and thereby correct the surface temperature for ambient temperature effects such that when the device is placed in an enclosure that is directed to a range of ambient enclosure air temperatures and said device being oriented towards an opening in said enclosure where a separate calibration illuminator, having a known emissivity and constant ambient temperature, is viewable by said device, the corrected surface temperatures of said separate calibration illuminator remain constant over the range of enclosure air temperatures. This same process is used to obtain the polynomial coefficients and independent validation data to confirm accuracy of the resulting surface temperature measurement over the device's specified ambient air temperature operating range.

The system 100 may also include an automation component programmed into the controller or processor 112. More specifically, as previously noted, the distance sensor 124 may be used to output a distance to a target in the same field of view (which mostly overlaps the field of view of the thermal image sensor 122), and the computing device 111 may prevent processing and image capture to from beginning unless there is an object within approximately 2.5 and approximately 4.5 feet from the thermal image sensor 122. Further, the computing device 111 may compute the change in distance at a desired interval (e.g., at an approximately 40 millisecond exposure time or approximately 25 distance measurements per second) and does not accept the change in distance until it is below a predetermined threshold (e.g., a standard deviation over a moving window of the last six distances below 20 mm/sec). Further still, if these conditions are met, the pixels within a masked region excluding the reference calibration units 140 are taken and the percentage greater than a designated value (e.g., approximately 70%) between ambient temperature and the expected normal human body surface temperature is taken and compared with another threshold (e.g., approximately 10%) and if this criteria met, the frame is marked as a valid read. In this example, the pixels are then sorted and the top six pixel values except the highest two in the frame are averaged, linearized to the reference calibration units 140, and distance-corrected. Once the system has collected a sufficient number of good frames per measurement interval (e.g., at least 20 good frames out of the prior 25 frames), the computing device 111 produces an average or other summary statistic (e.g., median of the top 10 except for the highest two).

In some examples, the data correction system 170 may correct for reduced temperatures arising from pixel insufficiency using the measured or calibrated spatial frequency of temperature variation across the face near the areas of interest. More specifically, the accurate detection of temperature from facial regions is dependent on having sufficient resolution to subtend the warmest uniform region of the face by at least 2.82 pixels (geometry for circular object and square pixels) for the warmest pixel to accurately relate to the surface temperature. In some approaches, systems may control a field of view and specify sufficient resolution such that the effective pixel spot-on-target size is half the spatial frequency of the warmest parts of the face (thus, the pixel spot-on-target size is the Nyquist spatial frequency). However, due to differences in human physiology, it may be difficult to control this minimum feature size. Further, it may be difficult and/or impossible to clearly demarcate a region size in real tissue since there are often gradients larger than thermal sensitivity down to very small sizes below one millimeter. In practice, downsampling typically corresponds to a reduction in measured temperature, due to pixel averaging between the warmest pixel and adjacent less-warm pixels. meaning any measurement is likely to be an underestimate. The Nyquist sampling relation implies one cannot retrieve original data in a case like this. However, this ignores prior knowledge of the spatial variation, which has been used to overcome the Nyquist relation in related fields such as physiologic noise determination in brain imaging and sub-Nyquist radiofrequency communication.

In the present system, the data correction system 170 may extract the actual maxima temperature from its approximate curve. More specifically, the data correction system 170 estimates the spatial frequency of temperature variations to ensure it is no more than one fourth the pixel Nyquist frequency. The data correction system 170 further estimates the local slope of temperature variation in the regions surrounding the maxima. The slope will vary with distance between adjacent spatial features, but the estimated average absolute slope at the edges of a pixel maxima are used by the data correction system 170. This estimated average absolute slope can be determined by interpolating the measured slopes nearby a maxima to the edge of the maxima pixel.

With this information, the effect of the actual thermal pixel binning can be determined and corrected for. For example, for the first $\pi$ radians of a sinusoidal curve being binned arbitrarily, no matter how small the binning size is, the average of the curve within that bin will never represent the maximum value of the actual sinusoid. For the area near the peak of a sinusoid, a linear approximation can be well within 10% of the actual value. Thus, the actual maxima of a sinusoid is equal to the average value of the bin plus one half the average absolute slope value at the pixel edge. More complex estimations can be used instead, and of particular interest is the use of population sampling to determine more accurate estimations through empirical fitting of maxima, adjacent values or slopes and clinical thermometry.

Advantageously, the system 100 can be used in environments with varying ambient temperatures to accurately detect temperatures of a subject, meaning the temperature of the environment does not impact the accuracy of the system 100. Compared to short-range scanners such as forehead scanners, the present system 100 is much more accurate, as forehead scanners typically are a single pixel and are not as accurate due to the entire area being averaged into a single pixel. The system 100 may be used in any number of additional environments such as long-term monitoring of neonate temperatures and/or industrial predictive sensing or other applications requiring accurate temperatures.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A temperature detection system for correcting a surface temperature measurement of a subject, the temperature detection system comprising:
   a housing;
   a thermal imaging system at least partially disposed within the housing, the thermal imaging system configured to capture at least one thermal image of the subject; and
   a data correction system communicatively coupled with the thermal imaging system, wherein the data correction system (i) performs a calibration using occluding targets having different sized holes in front of a controlled temperature calibration target set to different temperatures to generate a convolution kernel that corrects a local pixel radiant intensity error of the thermal imaging system, and (ii) corrects at least one error associated with the at least one thermal image of the subject including an error associated with a local pixel radiant intensity error, wherein to correct the at least one error, the data correction system is configured to apply the convolution kernel generated during the calibration to the at least one thermal image of the subject.

2. The temperature detection system of claim 1, further comprising a reference illumination system operably coupled with the housing, the reference illumination system including at least one external temperature reference source (ETRS) disposed within a field of view of the thermal imaging system, and wherein the data correction system corrects the at least one error based upon thermal image data representative of the reference illumination system.

3. The temperature detection system of claim 2, wherein the at least one reference calibration unit includes a first ETRS having a first set point value and a second ETRS having a second set point value.

4. The temperature detection system of claim 3, further including a shutter element operably coupled with the thermal imaging system, wherein the data correction system is configured to:

obtain an offset image associated with the shutter element from a memory;

correct a shutter-based nonuniformity error by subtracting the offset image from raw voltage values generated by the thermal imaging system when capturing the at least one thermal image to produce an offset-corrected image.

5. The temperature detection system of claim 4, wherein to generate the offset image, the data correction system:

receives a frame from the thermal imaging system indicative of (i) the first ETRS when set to the first set point value and (ii) the second ETRS when set to the second set point value;

determines an error between pixels of the frame representative of the first ETRS and the first set point value and pixels of the frame representative of the second ETRS and the second set point value;

interpolates the error to other pixels in the received frame;

generate the offset image based upon the determined or interpolated error for each pixel of the frame; and store the offset image in the memory.

6. The temperature detection system of claim 5, further comprising an unheated ambient air temperature probe that measures an ambient temperature operatively coupled to the data correction system and disposed within a field of view of the thermal imaging system when the first and second ETRSs are in a standby state, wherein the data correction system determines an error between pixels of the frame representative of the unheated ambient air temperature probe and the ambient temperature measured by the unheated ambient air temperature probe.

7. The temperature detection system of claim 5, wherein the data correction system sequentially receives two or more frames from the thermal imaging system and, for each pixel of the offset image, averages the determined or interpolated error with respect to the two or more frames.

8. The temperature detection system of claim 4, wherein to correct the at least one error, the data correction system divides the offset corrected image by a gain image generated by:

exposing the thermal imaging system to illumination emitted by the reference illumination value at a first set point value and at a second set point value;

calculating pixel-wise gain differences of the thermal imaging sensor between when the thermal imaging system is exposed to the first predetermined radiant intensity and the second predetermined radiant intensity; and scaling the pixel-wise gain differences based upon a difference between a first temperature corresponding to the first predetermined radiant intensity and a second temperature corresponding to the second predetermined radiant temperature.

9. The temperature detection system of claim 8, wherein pixels within at least one of the offset image or the gain image are associated with a low-order polynomial equation that represents the electrical offset or sensitivity to radiant intensity of incoming thermal emission respectively corresponding to pixels in the thermal image of the subject.

10. The temperature detection system of claim 8, further comprising a time-of-flight sensor for determining a distance to the subject that is operatively coupled to the data correction system, wherein the data correction system measures a change in the distance to the subject, as determined by the time-of-flight sensor, over a period of time and prevent processing of the at least one thermal image when the change in distance during the period is above a predetermined threshold.

11. The temperature detection system of claim 10, wherein the data correction system prevents processing of the at least one thermal image when the distance to the subject, as determined by the time-of-flight sensor, is outside of a threshold distance.

12. The temperature detection system of claim 1, wherein:

wherein the data correction system is operatively coupled to an unheated ambient air temperature probe that measures the ambient temperature;

to correct the at least one error, the data correction system applies a physiologic correction related to the subject to the at least one captured thermal image, wherein the physiologic correction is determined based upon a difference between the surface temperature of the subject and an ambient temperature.

13. The temperature detection system of claim 12, wherein the data correction system is operatively coupled to a heated probe that provides a first measurement of the ambient temperature and a second measurement of the ambient temperature provided by the unheated ambient air temperature probe, wherein the data correction system is configured to calculate an air conductance based upon the first measurement and the second measurement and the physiologic correction is further based upon the air conductance.

14. The temperature detection system of claim 1, wherein the local pixel radiant intensity error exhibits an inverse relation with a square root of an area of the hole of the occluding target.

15. The temperature detection system of claim 1, wherein the convolution kernel is a normalized inverse radial convolution kernel.

* * * * *